US012657648B2

(12) United States Patent
Croxford et al.

(10) Patent No.: US 12,657,648 B2
(45) Date of Patent: Jun. 16, 2026

(54) GRAPHICS PROCESSOR

(71) Applicant: Arm Limited, Cambridge (GB)

(72) Inventors: Daren Croxford, Swaffham Prior (GB);
Frank Klaeboe Langtind, Melhus
(NO); Robert William Genders,
Bottisham (GB)

(73) Assignee: ARM Limited, Cambridge (GB)

( * ) Notice: Subject to any disclaimer, the term of this
patent is extended or adjusted under 35
U.S.C. 154(b) by 143 days.

(21) Appl. No.: 18/503,916

(22) Filed: Nov. 7, 2023

(65) Prior Publication Data

US 2024/0193718 A1      Jun. 13, 2024

(30) Foreign Application Priority Data

Dec. 9, 2022    (GB) ..................................... 2218547

(51) Int. Cl.
*G06T 1/20*          (2006.01)
*G06T 17/10*         (2006.01)
(52) U.S. Cl.
CPC ................ *G06T 1/20* (2013.01); *G06T 17/10*
(2013.01)
(58) Field of Classification Search
CPC . G06T 1/20; G06T 17/10; G06T 11/40; G06T
15/005; G06T 2210/52
USPC .......................... 345/418, 505, 530, 553, 581
See application file for complete search history.

(56) References Cited

U.S. PATENT DOCUMENTS

| | | | | |
|---|---|---|---|---|
| 2007/0146378 | A1* | 6/2007 | Sorgard ................... | G06F 18/22 |
| | | | | 345/581 |
| 2008/0150950 | A1* | 6/2008 | Sorgard ................... | G06T 11/40 |
| | | | | 345/530 |
| 2010/0177105 | A1* | 7/2010 | Nystad .................. | G06T 15/005 |
| | | | | 345/553 |
| 2013/0002663 | A1 | 1/2013 | Howson | |
| 2014/0118364 | A1* | 5/2014 | Hakura ..................... | G06T 1/60 |
| | | | | 345/505 |
| 2015/0213638 | A1 | 7/2015 | Dimitrov et al. | |
| 2016/0163087 | A1 | 6/2016 | Cho | |
| 2016/0260241 | A1 | 9/2016 | Jin | |
| 2016/0314618 | A1 | 10/2016 | Yang | |
| 2017/0309027 | A1 | 10/2017 | Kleen | |
| 2017/0316601 | A1* | 11/2017 | Kakarlapudi ........... | G06T 19/20 |
| 2018/0276876 | A1 | 9/2018 | Yang | |

(Continued)

FOREIGN PATENT DOCUMENTS

| | | |
|---|---|---|
| GB | 2540227 A | 1/2017 |
| GB | 2611375 A | 3/2022 |

(Continued)

OTHER PUBLICATIONS

Non-final Office Action dated Jul. 3, 2025, U.S. Appl. No. 18/517,191,
filed Nov. 22, 2023.

(Continued)

*Primary Examiner* — Prabodh M Dharia

(74) *Attorney, Agent, or Firm* — Pearl Cohen Zedek
Latzer Baratz LLP

(57)          ABSTRACT

A tiled-based graphics processor that comprises a plurality
of tiling units is disclosed. The graphics processor includes
an assigning circuit that assigns tiling units to sort geometry
for initial regions of a render output that encompass plural
primitive listing regions, and causes assigned tiling units to
sort geometry for an initial region into primitive listing
regions that the initial region encompasses.

20 Claims, 18 Drawing Sheets

(56)                    References Cited

U.S. PATENT DOCUMENTS

| | | | |
|---|---|---|---|
| 2019/0139294 A1 | 5/2019 | Redshaw | |
| 2020/0065935 A1 | 2/2020 | Yang | |
| 2020/0111247 A1 | 4/2020 | Heggelund | |
| 2020/0151926 A1 | 5/2020 | Uhrenholt | |
| 2021/0110510 A1* | 4/2021 | Brigg | G06T 1/60 |
| 2021/0158585 A1* | 5/2021 | Chalfin | G06T 7/60 |
| 2021/0256746 A1* | 8/2021 | Jesus | G06T 15/04 |
| 2021/0366188 A1 | 11/2021 | Kondguli | |
| 2023/0260074 A1* | 8/2023 | Brigg | G06T 15/005 |

FOREIGN PATENT DOCUMENTS

| | | |
|---|---|---|
| GB | 2611372 A | 4/2023 |
| GB | 2611374 A | 4/2023 |
| WO | WO2022084666 A1 | 4/2022 |
| WO | WO2022096879 A1 | 5/2022 |

OTHER PUBLICATIONS

Combined Search and Examination Report under Sec. 17 and 18(3) dated Jun. 14, 2023, GB Patent Application No. 2218544.1.

U.S. Appl. No. 18/517,191, filed Nov. 22, 2023.

Combined Search and Examination Report under Sec. 17 and 18(3) dated Jun. 19, 2023, GB Patent Application No. 2218547.4.

Response to Office Action dated Aug. 26, 2025, U.S. Appl. No. 18/517,191, filed Nov. 22, 2023.

Final Office Action dated Sep. 23, 2025, U.S. Appl. No. 18/517,191, filed Nov. 22, 2023.

Response to Office Action dated Dec. 22, 2025, U.S. Appl. No. 18/517,191, filed Nov. 22, 2023.

Non-final Office Action dated Mar. 19, 2026, U.S. Appl. No. 18/517,191, filed Nov. 22, 2023.

* cited by examiner

507

1611

1621

GRAPHICS PROCESSOR

BACKGROUND

The technology described herein relates to computer graphics processing, and in particular to tile-based graphics processing.

Graphics processing is normally carried out by first dividing the graphics processing (render) output to be rendered, such as a frame to be displayed, into a number of similar basic components of geometry to allow the graphics processing operations to be more easily carried out. These basic components of geometry may often be referred to graphics "primitives", and such primitives are usually in the form of simple polygons, such as triangles, points, lines, or groups thereof.

Each primitive (e.g. polygon) is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated.

Typically, the overall output, e.g. frame to be generated, will be divided into smaller units of processing, referred to as "draw calls". Each draw call will have a respective set of vertices defined for it and respective primitives (or, generally, sets of geometry) that use those vertices. For a given frame, there may, e.g., be of the order of a few thousand draw calls, and hundreds of thousands (or potentially millions) of primitives. The draw calls for a render output, as well as the primitives within a draw call, will usually be provided in the order that they are to be processed by the graphics processing system.

Once primitives and their vertices have been generated and defined, they can be processed by the graphics processing system, in order to generate the desired graphics processing output (render output), such as a frame for display. This basically involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively. (The term "rasterisation" is sometimes used to mean both primitive conversion to sample positions and rendering. However, herein "rasterisation" will be used to refer to converting primitive data to sampling point addresses only.)

One form of graphics processing uses so-called "tile-based" rendering. In tile-based rendering, the two-dimensional render output (i.e. the output of the rendering process, such as an output frame to be displayed) is rendered as a plurality of smaller area regions, usually referred to as "tiles". In such arrangements, the render output is typically divided (by area) into regularly-sized and shaped rendering tiles (they are usually e.g., squares or rectangles).

Other terms that are commonly used for "tiling" and "tile-based" rendering include "chunking" (the rendering tiles are referred to as "chunks") and "bucket" rendering.

The terms "tile" and "tiling" will be used hereinafter for convenience, but it should be understood that these terms are intended to encompass all alternative and equivalent terms and techniques wherein the render output is rendered as a plurality of smaller area regions.

In a tile-based graphics processing pipeline, the geometry (primitives) for the render output being generated is sorted into primitive listing regions of the render output area, so as to allow the geometry (primitives) that need to be processed for a given region of the render output to be identified. This sorting allows primitives that need to be processed for a given region of the render output to be identified (so as to, e.g., avoid unnecessarily rendering primitives that are not actually present in a region).

The tiling (sorting) process is typically performed by a hardware unit of the graphics processor that is provided specifically for that purpose, usually referred to as a "tiling unit" (or "tiler"). The tiling process produces lists of primitives to be rendered for different primitive listing regions of the render output (commonly referred to as "primitive" or "tile" lists). In effect, each render output region can be considered to have a bin (the primitive list) into which any primitive that is found to fall within (i.e. intersect) the region is placed (and, indeed, the process of sorting the primitives on a region-by-region basis in this manner is commonly referred to as "binning"). A render output primitive listing region for which a primitive list is prepared could be a single rendering tile, or a group of plural rendering tiles, etc.

Once the primitive lists have been prepared for all the render output regions, each rendering tile is processed, by rasterising and rendering the primitives listed for the rendering tile.

The Applicants believe there remains scope for improvements to tiling and tile-based graphics processors.

BRIEF DESCRIPTION OF THE DRAWINGS

Various embodiments will now be described, by way of example only, and with reference to the accompanying drawings in which.

3

Figure 11:
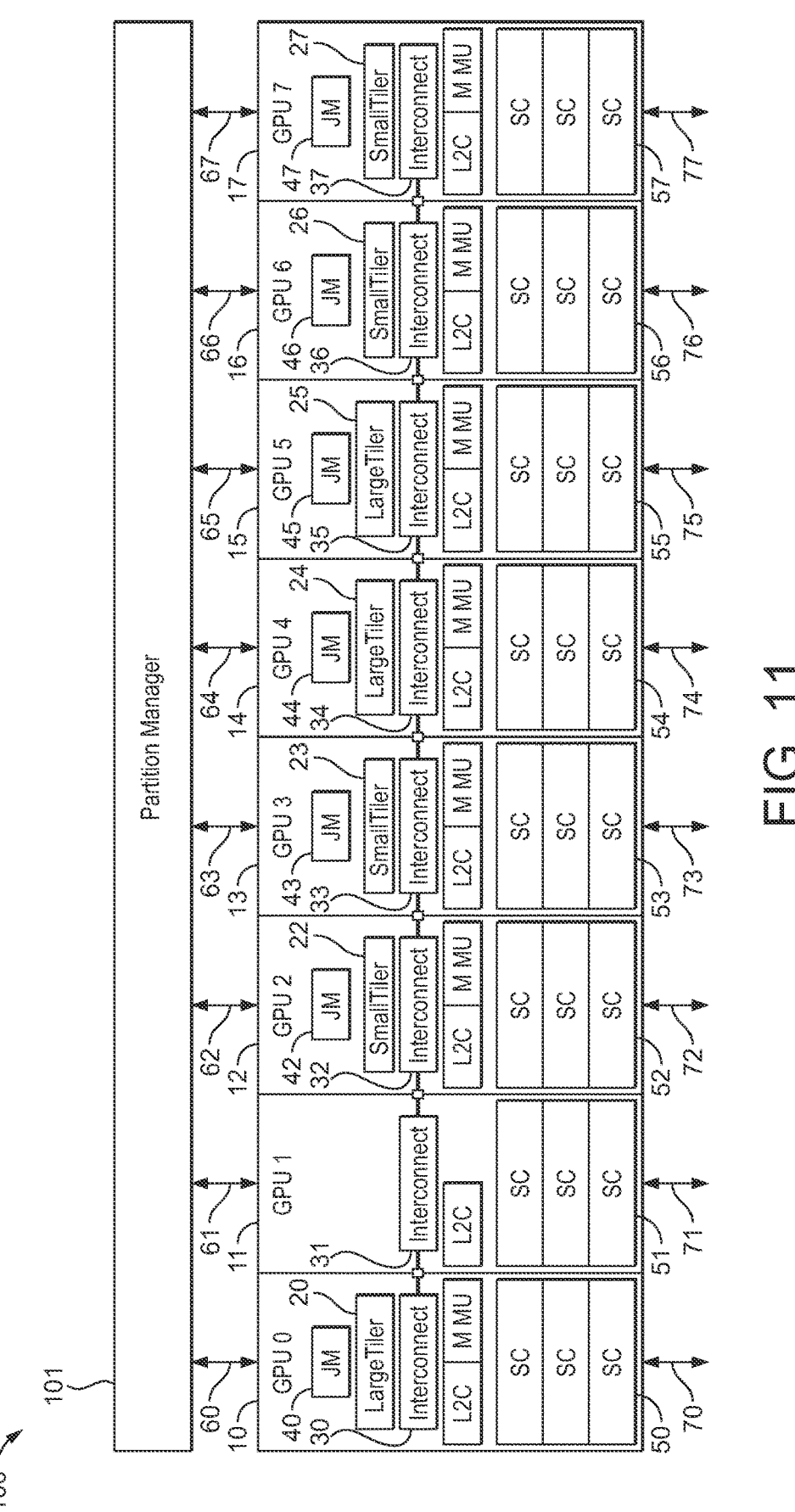
FIG. 11 illustrates a graphics processor that may be operated in accordance with embodiments of the technology described herein.
Figure 12B:
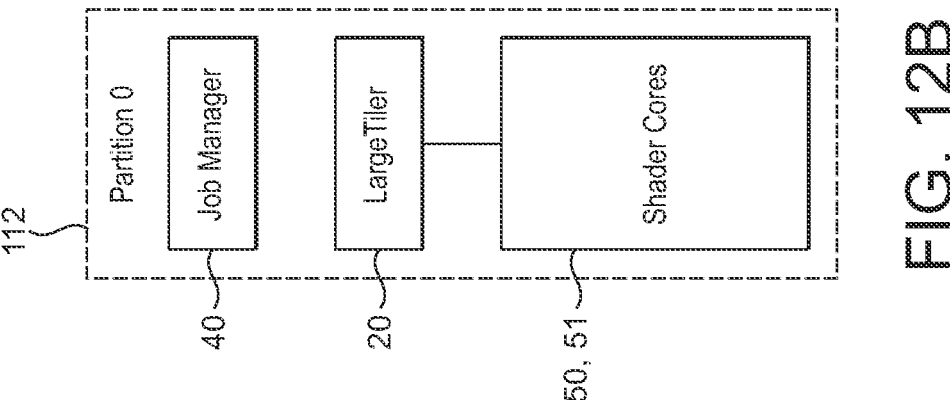
Figure 12A:
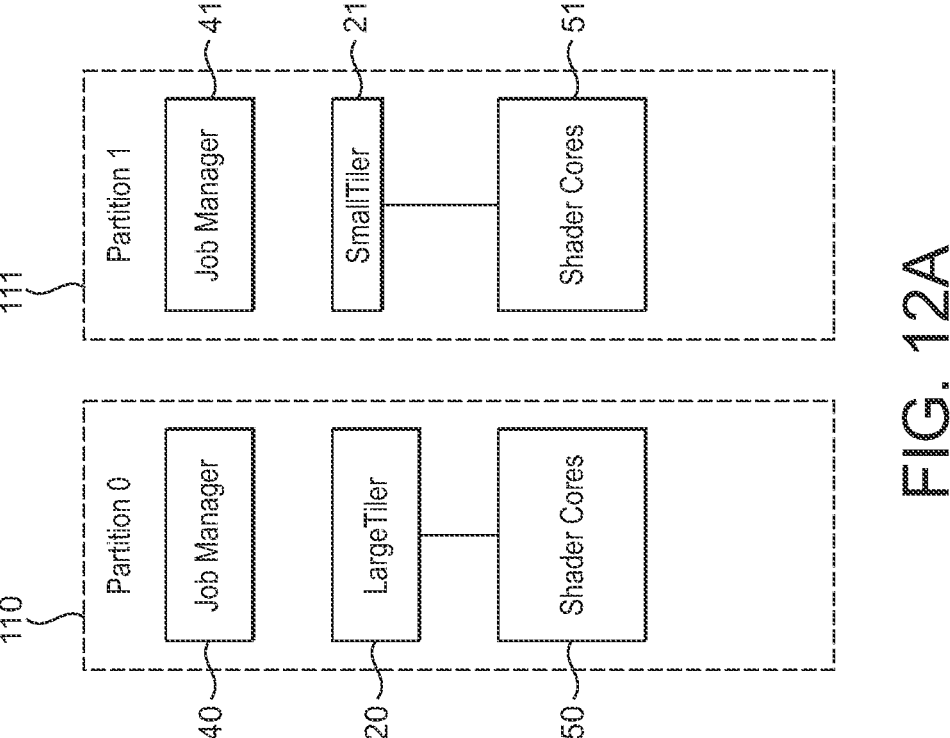
Figure 13:
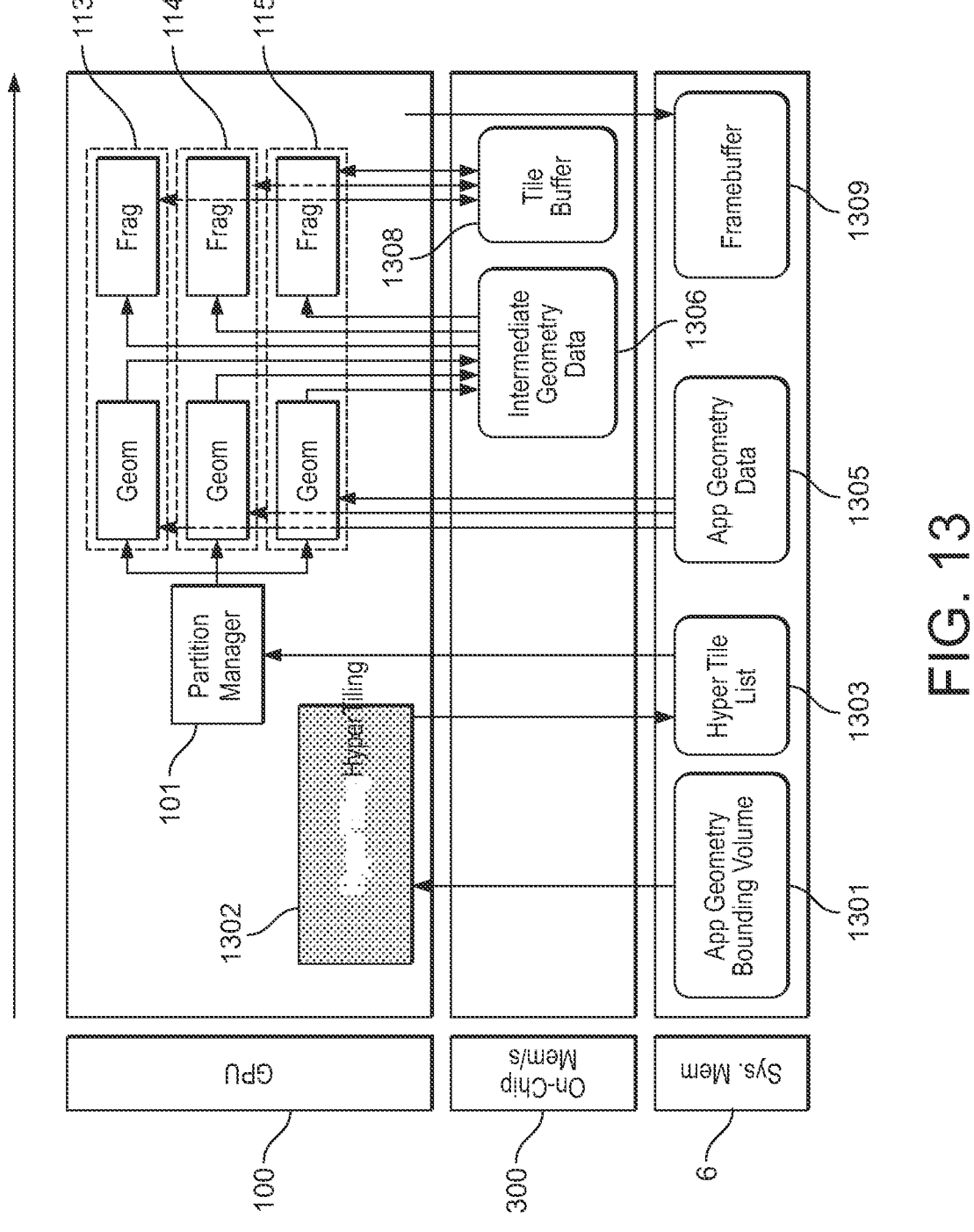
Figure 14:
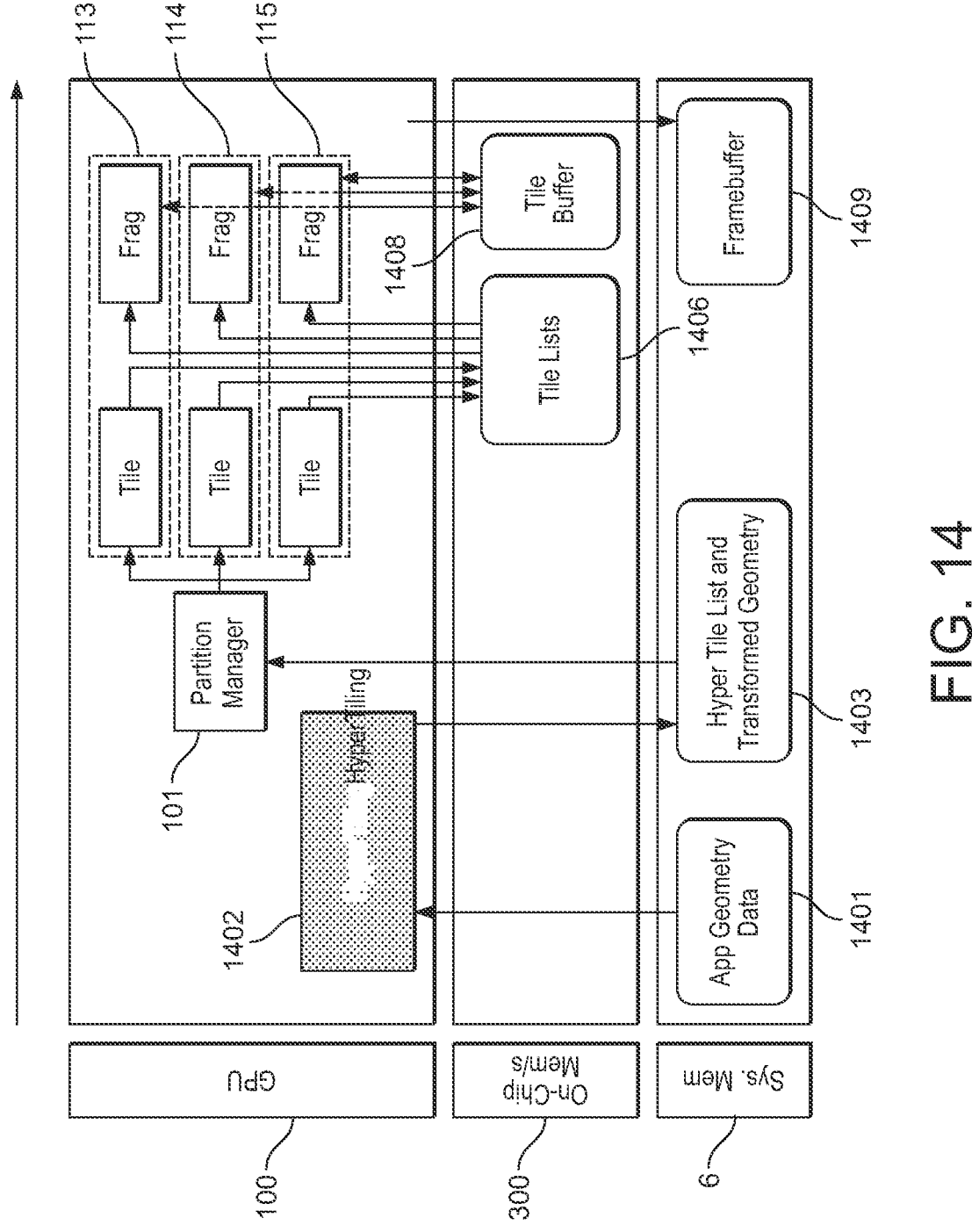
Figure 15:
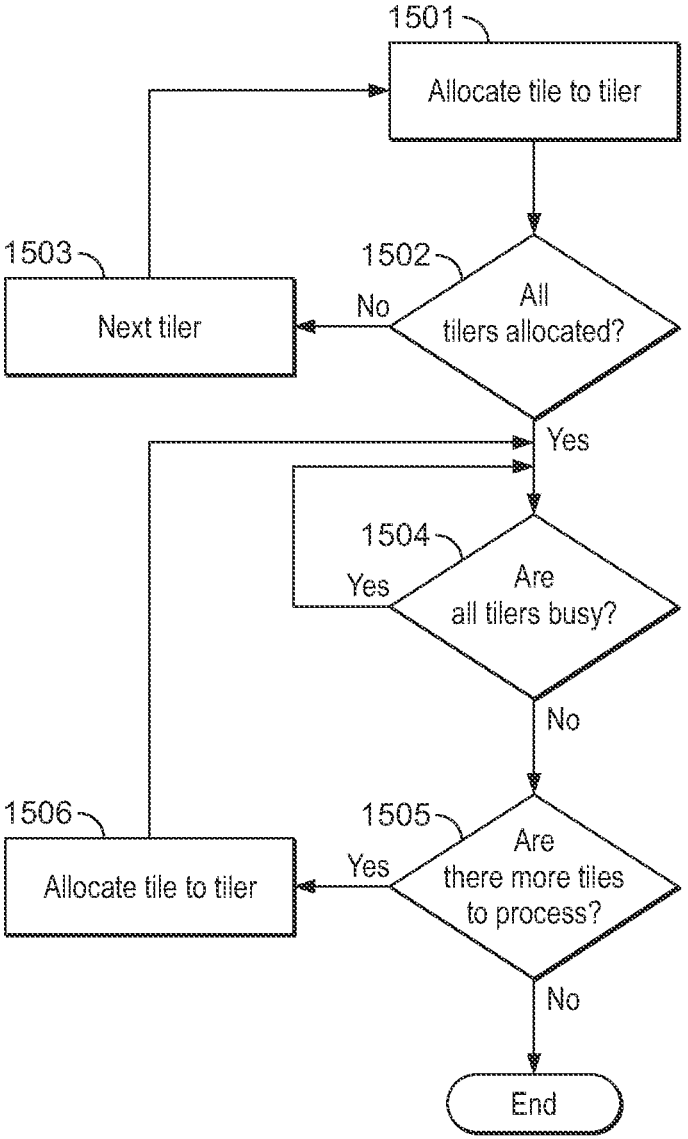
Figure 16A:
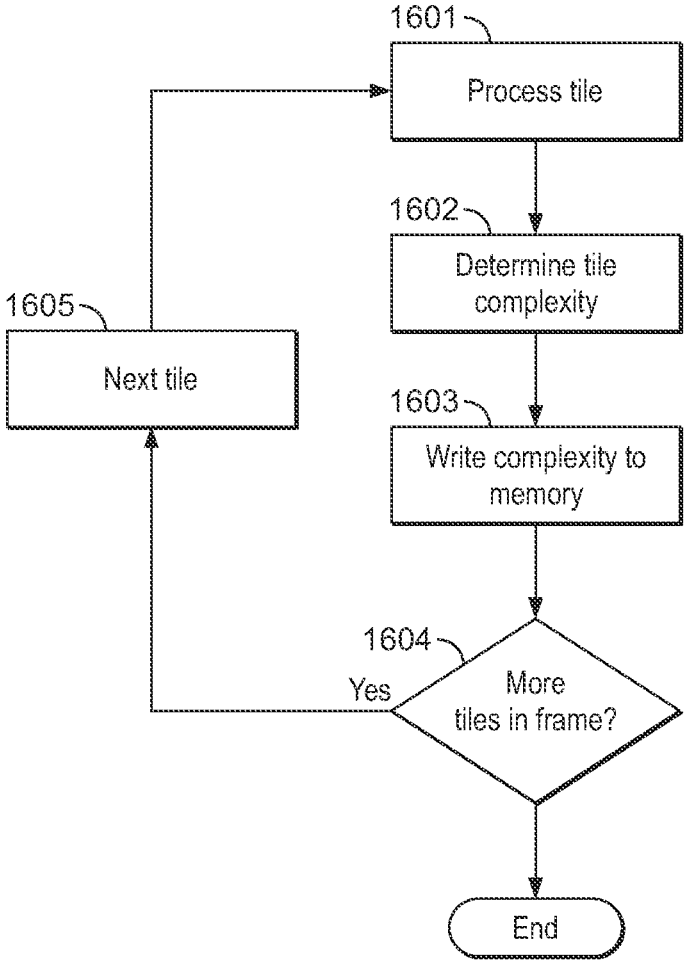
Figure 16B:
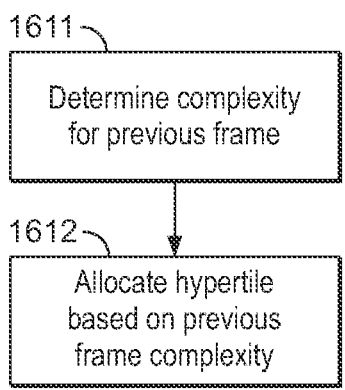
Figure 16C:
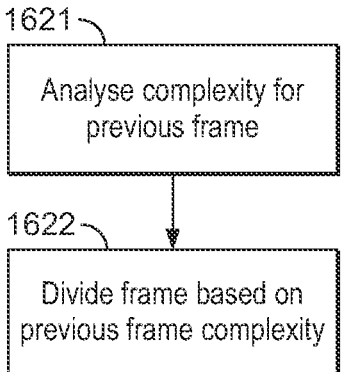

FIG. 12A and FIG. 12B illustrate different ways in which the graphics processor of FIG. 11 may be operated;

FIG. 13 illustrates a graphics processing process in accordance with embodiments of the technology described herein;

FIG. 14 illustrates a graphics processing process in accordance with embodiments of the technology described herein;

FIG. 15 illustrates a tiling unit allocation process in accordance with embodiments of the technology described herein; and FIG. 16A and FIG. 16B illustrate a tiling unit allocation process, and FIG. 16C illustrates a hypertile division process, in accordance with embodiments of the technology described herein.

Like reference numerals are used for like elements in the drawings as appropriate.

DETAILED DESCRIPTION

A first embodiment of the technology described herein comprises a method of operating a tiled-based graphics processor that comprises a plurality of tiling units operable to sort geometry to be processed to generate a render output into primitive listing regions that the render output is divided into; the method comprising:

sorting geometry to be processed to generate a render output into a set of initial regions that the render output is divided into, wherein each initial region of the set of initial regions encompasses plural primitive listing regions; and for each of one or more initial regions of the set of initial regions:

assigning a tiling unit of the plurality of tiling units to sort geometry for the respective initial region into primitive listing regions that the respective initial region encompasses; and the assigned tiling unit sorting the geometry for the respective initial region into the primitive listing regions that the respective initial region encompasses.

A second embodiment of the technology described herein comprises a tiled-based graphics processor comprising:

a plurality of tiling units operable to sort geometry to be processed to generate a render output into primitive listing regions that the render output is divided into; and an assigning circuit configured to, for each of one or more initial regions of a set of initial regions that a render output is divided into, and into which geometry to be processed to generate the render output is sorted, and wherein each initial region of the set of initial regions encompasses plural primitive listing regions:

assign a tiling unit of the plurality of tiling units to sort geometry for the respective initial region into primitive listing regions that the respective initial region encompasses; and cause the assigned tiling unit to sort the geometry for the respective initial region into the primitive listing regions that the respective initial region encompasses.

The technology described herein is concerned with a graphics processor that has plural (in embodiments separate) tiling units. Each tiling unit should be, and in embodiments is, operable to perform tiling (in embodiments independently of any other tiling unit), i.e. sort geometry to be processed to generate a render output into a set of primitive listing regions (e.g. rendering tiles), e.g. and thereby prepare primitive lists for the primitive listing regions (e.g. rendering tiles), e.g. as discussed above.

As will be discussed in more detail below, the inventors have recognised that it may be desirable to provide a graphics processor with plural tiling units, as plural tiling units can provide a greater degree of configurability as compared to typical arrangements in which a graphics processor has only one tiling unit. For example, the provision of plural tiling units may allow a graphics processor to perform a wider range of rendering tasks efficiently. For example, and in embodiments, fewer tiling units, such as only one tiling unit, may be used to perform a simpler rendering task, and more, such as all, of the tiling units may be used to perform a more complex rendering task.

In embodiments of the technology described herein, prior to the tiling units performing the tiling sorting operation, an initial, "higher level" sorting operation is performed. This initial sorting operation sorts the geometry into a set of initial regions that the render output is divided into. As will be discussed in more detail below, these initial regions are larger than individual rendering tiles, and each encompass plural primitive listing regions, and so may be referred to as "hypertiles".

Then, for each of one or more (such as plural, in embodiments all) of the initial regions (hypertiles), a respective one of the tiling units of the plurality of tiling units is assigned (selected) to process, and processes, geometry for (sorted into) the respective initial region (hypertile). That is, in embodiments, a (each) initial region (hypertile) is assigned to (only) one of the plurality of tiling units, and the assigned tiling unit performs the tiling sorting operation in respect of that initial region (hypertile).

Thus, for example, and in embodiments, a first tiling unit of the plurality of tiling units prepares primitive lists for primitive listing regions (e.g. rendering tiles) encompassed by a first initial region (hypertile) of the render output, and a second, different tiling unit of the plurality of tiling units prepares primitive lists for primitive listing regions (e.g. rendering tiles) encompassed by a second, different initial region (hypertile) of the same render output.

Thus, in embodiments, there are in effect two sorting operations: an initial, higher level ("hypertiling") operation to sort geometry into initial regions (hypertiles), followed by the tiling sorting operation performed by the tiling units to sort the geometry into primitive listing regions (e.g. rendering tiles).

The inventors have found that this can enable plural tiling units to efficiently work together on the same rendering task. In particular, the inventors have realised that since the tiling process for one render output region (e.g. hypertile) can be performed independently of any other render output region (e.g. hypertile), different regions (e.g. hypertiles) of the same render output (e.g. frame) can be processed by different tiling units without work being duplicated by different tiling units.

It will be appreciated therefore, that the technology described herein provides an improved tile-based graphics processor.

The geometry to be processed to generate a render output may comprise any suitable and desired graphics processing geometry. In embodiments, the geometry comprises graphics primitives, in embodiments in the form of polygons, such as triangles, points, lines, or groups thereof. In embodiments, each primitive (e.g. polygon) is defined by and represented as a set of vertices. In embodiments, each vertex has associated with it a set of vertex data (such as position, colour, texture and other attributes data, etc.).

The geometry can be provided in any suitable manner. In embodiments, the geometry for a render output is provided by a host processor that requires the render output. In embodiments, the geometry is provided by a driver executing on the host processor, in embodiments in response to instructions from an application, e.g. game, executing on the host processor. In embodiments, the graphics processor comprises a geometry receiving circuit that receives the geometry from the host processor.

In embodiments, geometry data representing the geometry is provided, and in embodiments is written to memory by (the driver executing on) the host processor, and is read therefrom by (the geometry receiving circuit of) the graphics processor. The memory may be, and in embodiments is, on a different chip to the graphics processor, and may, for example, be a main memory of the overall graphics processing system that the graphics processor is part of. It may be dedicated memory for this purpose or it may be part of a memory that is used for other data as well.

The geometry data (initially provided by the host processor) may be subjected to any suitable vertex and/or geometry processing. In embodiments, the geometry data (initially provided by the host processor) is subject to a transformation (vertex processing) operation by the graphics processor. The transformation (vertex processing) operation may, for example, generate transformed geometry data by transforming the geometry from the world or model space in which it is initially defined (e.g. by the application) to a screen space that the render output is to be displayed in.

The tile-based graphics processor should, and in embodiments does, generate the render output on a tile-by-tile basis using the geometry data. The render output (area) should thus be, and in embodiments is, divided into plural rendering tiles for rendering purposes.

The render output may comprise any suitable render output, such as frame for display, or render-to-texture output, etc. The render output will typically comprise an array of data elements (sampling points) (e.g. pixels), for each of which appropriate render output data (e.g. a set of colour value data) is generated by the graphics processor. The render output data may comprise colour data, for example, a set of red, green and blue, RGB values and a transparency (alpha, a) value. Where the graphics processor generates plural (e.g. a series of) render outputs, each render output may be generated in accordance with the technology described herein.

The tiles that the render output is divided into for rendering purposes can be any suitable and desired such tiles. The size and shape of the rendering tiles may normally be dictated by the tile configuration that the graphics processor is configured to use and handle.

The rendering tiles are in embodiments all the same size and shape (i.e. regularly-sized and shaped tiles are in embodiments used), although this is not essential. The tiles are in embodiments rectangular, and in embodiments square. The size and number of tiles can be selected as desired. In embodiments, each tile is 16×16, 32×32, or 64×64 data elements (sampling positions) in size (with the render output then being divided into however many such tiles as are required for the render output size and shape that is being used).

To facilitate tile-based graphics processing, the tile-based graphics processor should, and in embodiments does, include one or more tile buffers that store rendered data for a rendering tile being rendered by the tile-based graphics processor, until the tile-based graphics processor completes the rendering of the rendering tile.

The tile buffer should be, and in embodiments is, provided local to (i.e. on the same chip as) the tile-based graphics processor, for example, and in embodiments, as part of local memory (e.g. RAM that is located on (local to) the graphics processor (chip)). The tile buffer may accordingly have a fixed storage capacity, for example corresponding to the data (e.g. for an array or arrays of sample values) that the tile-based graphics processor needs to store for (only) a single rendering tile until the rendering of that tile is completed.

Once a rendering tile is completed by the tile-based graphics processor, rendered data for the rendering tile should be, and in embodiments is, written out from the tile buffer to other storage that is in embodiments external to (i.e. on a different chip to) the tile-based graphics processor, such as a frame buffer in the memory, for use. The graphics processor in embodiments includes a write out circuit coupled to the tile buffer for this purpose.

The graphics processor of the technology described herein includes plural tiling units. In embodiments, a (each) tiling unit is a hardware unit of the graphics processor. The tiling units may comprise separate circuits, or may be at least partially formed of shared processing circuits.

In embodiments, a (each) tiling unit is selectively activatable. Thus, for example, and in embodiments, more tiling units may be activated when processing a relatively more complex render output, and fewer tiling units may be activated when processing a relatively less complex output.

In embodiments, the number of tiling units activated (i.e. the number of tiling units that can be assigned (by the assigning circuit)) is adaptively varied. Thus, in embodiments, it is determined whether the number of tiling units activated should be changed, and when it is determined that the number of tiling units activated should be changed, the number of tiling units activated is changed.

It is believed that the idea of adaptively varying the number of tiling units activated may be novel and inventive in its own right. Thus, another embodiment comprises a method of operating a tiled-based graphics processor that comprises a plurality of tiling units, wherein each tiling unit is selectively activatable; the method comprising:

determining whether the number of tiling units activated should be changed; and when it is determined that the number of tiling units activated should be changed, changing the number of tiling units activated.

Another embodiment comprises a tiled-based graphics processor comprising:

a plurality of tiling units, wherein each tiling unit is selectively activatable; and a control circuit configured to:

determine whether the number of tiling units activated should be changed; and when it is determined that the number of tiling units activated should be changed, change the number of tiling units activated.

These embodiments can, and in an embodiment do, include one or more, and in an embodiment all, of the features of other embodiments described herein, as appropriate.

In embodiments, the number of tiling units activated is increased in response to a determination that too few tiling units are activated, and the number of tiling units activated is decreased in response to a determination that too many tiling units are activated. For example, if stalling occurs when generating a render output (e.g. frame), more tiling units may be activated to process the next render output (e.g. frame). Similarly, if stalling does not occur when generating a render output (e.g. frame), fewer tiling units may be activated to process the next render output (e.g. frame).

The graphics processor can include any suitable number of plural tiling units, such as two, three, four, or more. All of the tiling units may be substantially the same as each other, or some or all of the tiling units may be different to each other.

For example, and in embodiments, all of the tiling units may have the same processing capacity as each other (in other words, the maximum rate at which a tiling unit can prepare primitive lists may be the same for all of the tiling units (for a given set of input data)), or there may be tiling units that have different processing capacities (different maximum rates at which primitive lists can be prepared (for a given set of input data)). For example, tiling units may have the same or different memory capacities, e.g. the same or different sized buffers. The distribution of processing capacities may be selected as desired, for example, and in embodiments, as discussed in WO 2022/096879, the entire contents of which is hereby incorporated herein by reference.

In embodiments of the technology described herein, geometry to be processed to generate a render output is initially sorted into a set of initial regions (hypertiles) that the render output (area) is divided into.

The initial regions (hypertiles) should be, and in embodiments are, larger than the rendering tiles, and may correspondingly be larger than the primitive listing regions. The render output can be divided into any suitable number of (plural) initial regions. The initial regions (hypertiles) are in embodiments rectangular, and in embodiments square. The initial regions (hypertiles) may be all the same size and shape (i.e. regularly-sized and shaped hypertiles may be used), or different sized initial regions (hypertiles) may be used.

In embodiments, each initial region (hypertile) is the same size and shape as (encompasses) plural contiguous rendering tiles (but in embodiments not all of the rendering tiles) of the render output. For example, an initial region (hypertile) may be 256×256 data elements (sampling positions) in size, and thus encompass 8×8 rendering tiles that are each 32×32 data elements in size, or 16×16 rendering tiles that are each 16×16 data elements in size, etc.

Each initial region (hypertile) should, and in embodiments does, encompass a respective subset of a set of primitive listing regions that the render output is divided into. In embodiments, each initial region of the set of initial regions encompasses different primitive listing regions to each other initial region of the set of initial regions. An initial region (hypertile) may encompass any suitable number of plural primitive listing regions.

The initial sorting (hypertiling) process should, and in embodiments does, determine which initial region(s) (hypertile(s)) geometry should be processed for. In embodiments, the initial sorting process generates information indicating which geometry should be processed for which initial regions (hypertiles) of the render output. In embodiments, this information is written to external memory or local memory. The information may comprise, for example and in embodiments, a list of geometry for each initial region (hypertile), or an array of flags (e.g. a bitmap) indicating which geometry is to be processed for which initial region (hypertile).

In embodiments, the results of the initial sorting process (e.g. initial (hypertile) lists) are used in the subsequent tiling sorting process (by the tiling units) to determine which primitive listing region(s) geometry should be processed for. Thus, in embodiments, a (each) tiling unit (reads in and) uses the information generated by the initial sorting process (e.g. initial (hypertile) list) for an initial region (hypertile) it is assigned to process (and the geometry data) to prepare a set of primitive lists for primitive listing regions (e.g. rendering tiles) encompassed by the initial region (hypertile).

The primitive listing regions of the render output that a tiling unit can prepare primitive lists for may correspond to single rendering tiles or to sets of plural rendering tiles (e.g. in the case of "hierarchical tiling" arrangements). Thus, a (each) tiling unit may prepare a primitive list for each rendering tile encompassed by an initial region (hypertile) it is assigned to process. A (each) tiling unit may further prepare a primitive list for each of one or more larger primitive listing regions encompassed by an initial region (hypertile) it is assigned to process. In embodiments, each such larger primitive listing region encompasses plural contiguous smaller primitive listing regions/rendering tiles. In embodiments, the largest primitive listing region that a (each) tiling unit can prepare a primitive list for is the same size and shape as an initial region (hypertile). Other arrangements are possible.

The initial sorting process and the tiling sorting process may be performed in substantially the same manner, e.g. at the granularity of individual primitives, with the same degree of accuracy, precision, etc. Thus, the initial sorting process may comprise preparing information (e.g. initial primitive lists) indicating which primitives should be processed for which initial regions (hypertiles) of the render output, and the tiling process may comprise (the tiling units) using the information (e.g. initial primitive lists) to prepare primitive lists indicating which primitives should be processed for which primitive listing regions (e.g. rendering tiles) of the render output.

In this case, the initial sorting process may comprise transforming the geometry data, and using the transformed geometry data to sort the geometry into the set of initial regions. The tiling process may then comprise (re-)using the transformed geometry data generated in the initial sorting process to sort the geometry into the primitive listing regions. To facilitate this, the transformed geometry data generated in the initial sorting process may be stored in external memory or local memory for use in the subsequent tiling process.

Alternatively, the transformed geometry data generated in the initial sorting process may be discarded (not stored for use in the subsequent tiling process), and instead re-generated for the tiling process. Thus, the initial sorting process may comprise transforming the geometry data, and using the transformed geometry data to sort the geometry into the set of initial regions, and the tiling sorting process may comprise (re-)transforming the geometry data, and using the (re-)transformed geometry data to sort the geometry into the primitive listing regions.

In other embodiments, the initial sorting process and the tiling sorting process are performed in a substantially different manner, e.g. at a different granularity, with a different degree of accuracy, precision, etc. The initial sorting process may, for example, be performed with less precision than the subsequent tiling process. In embodiments, the initial sorting (hypertiling) process is performed using a simpler or "higher level" representation of the geometry than the tiling sorting process, e.g. such that the initial sorting (hypertiling) process can be performed using less bandwidth and/or processing effort than would otherwise be the case.

The initial sorting process may thus comprise using a simplified (higher level) representation of the geometry to prepare information (e.g. initial (hypertile) lists) indicating which geometry should be processed for which initial regions (hypertiles) of the render output, and the tiling process may comprise (the tiling units) using the information (e.g. initial (hypertile) lists) to prepare primitive lists indicating which primitives should be processed for which primitive listing regions (e.g. rendering tiles) of the render output.

In this case, the initial sorting process may comprise transforming the simplified (higher level) representation of the geometry, and using the transformed simplified (higher level) representation to sort the geometry into the set of initial regions. The tiling process may then comprise transforming the (lower level) geometry data, and using the transformed geometry data to sort the geometry into the primitive listing regions.

In embodiments, the initial sorting (hypertiling) process is performed substantially as described in WO 2022/084666, the entire contents of which is hereby incorporated by reference. Thus, in embodiments, the geometry is partitioned into one or more groups of one or more (e.g. plural) primitives, and a simplified (higher level) representation of each group of primitives is provided, and used in the initial sorting process.

A simplified (higher level) representation of a group of one or more primitives may comprise, for example, a bounding box for the group of one or more primitives (that includes all of the one or more primitives in the group). A bounding box may comprise either a (2D) bounding area or a (3D) bounding volume, e.g. depending on the application (and geometry) in question. For example, a 2D bounding box may comprise a rectangle, or other shape. Similarly, a 3D bounding box may comprise a cuboid, sphere, or other shape. Other suitable simplified (higher level) representations may also be used.

A simplified (higher level) representation of the geometry may be provided by the graphics processor processing the (lower level) geometry data. In embodiments, a simplified (higher level) representation of the geometry is provided separately and in addition to the (lower level) geometry data, in embodiments by the application or driver that requires the render output, e.g. and in embodiments, as described in WO 2022/084666. The simplified (higher level) representation may be written to the memory, e.g. stored and provided as separate metadata associated with the (lower level) geometry data.

The initial sorting process and the tiling sorting process may be performed by different processing entities. For example, the graphics processor may comprise a sorting circuit operable to perform the initial sorting process, with the tiling process being performed by the tiling units. The initial sorting process may be performed by one or more programmable execution units (e.g. shader cores) of the graphics processor, with the tiling process being performed by the tiling units. Alternatively, the initial sorting process may be performed by a processing entity other than the graphics processor. For example, the initial sorting process may be performed by the host processor, with the tiling process being performed by the tiling units of the graphics processor.

In embodiments, the initial sorting process and the tiling sorting process are both performed by tiling units of the graphics processor. Thus, in embodiments, sorting the geometry into the set of initial regions (hypertiles) is performed by a tiling unit of the plurality of tiling units.

To facilitate this latter case, in embodiments, the plurality of tiling units includes at least one tiling unit that is selectively configurable to either perform initial sorting (hypertiling) or to perform tiling. In embodiments, the at least one tiling unit performs the initial sorting (hypertiling) to sort the geometry into initial regions (hypertiles), and then processes (performs tiling for) at least one of the initial regions (hypertiles).

In embodiments of the technology described herein, once the geometry to be processed to generate the render output has been sorted into the set of initial regions (hypertiles), different tiling units are assigned (by the assigning circuit) to process (geometry for) different initial regions (hypertiles) of the render output, e.g. so as to share the processing requirements for the render output between the different tiling units.

Tiling units can be assigned to process initial regions (hypertiles) in any suitable and desired manner. For example, and in embodiments, a tiling unit may be assigned only one respective initial region (hypertile) of the render output (e.g. in the case where there are the same number of initial regions (hypertiles) as tiling units) and/or a tiling unit may be assigned plural initial regions (hypertiles) of the render output (e.g. in the case where there are more initial regions (hypertiles) than tiling units).

Tiling units may be assigned to process initial regions (hypertiles) (by the assigning circuit) in accordance with a scheduling scheme, e.g. that attempts to achieve load balancing between the different tiling units. For example, tiling units/initial regions may be assigned in a sequence, e.g. with a first tiling unit being assigned to process a first initial region (hypertile), the next tiling unit being assigned to process the next initial region (hypertile), and so on. Alternatively, the assigning circuit may attempt to assign a tiling unit that is not (currently) processing an initial region (hypertile), and if all of the tiling units are (currently) processing an initial region (hypertile), the assigning circuit may assign the first tiling unit to complete its processing, etc.

Where tiling units have different processing (e.g. memory) capacities, the different processing capacities may be taken into account when assigning tiling units to process initial regions (hypertiles). For example, a higher processing capacity tiling unit may be preferentially selected (by the assigning circuit) to process a larger or more complex initial region (hypertile), and/or more initial regions (hypertiles) may be assigned (by the assigning circuit) to a higher processing capacity tiling unit than to a lower processing capacity tiling unit.

Thus, in embodiments, a tiling unit is assigned to process geometry for an initial region based on a processing capacity of the tiling unit. In embodiments, a tiling unit is assigned to process geometry for an initial region based on a size and/or complexity of the region.

In embodiments, as well as, or instead of, attempting to achieve load balancing between different tiling units by selecting which tiling units process which regions (hypertiles), load balancing between different tiling units may be attempted to be achieved by selecting the shapes and/or sizes of the regions (hypertiles). Thus, the render output may be divided into the regions (hypertiles) based on the expected complexity of the resulting regions (hypertiles). For example, the render output may be divided into regions such that the complexity of the resulting regions is expected to match the processing capacities of the tiling units.

The complexity of a region (hypertile) may relate to any aspect of the region, such as a desired rendering quality for the region, or the complexity of the geometry to be processed to generate the region. For example, a greater number of primitives and/or vertices may indicate a greater degree of complexity.

It may be known which regions are likely to be more complex than others, and this knowledge used when assigning tiling units/dividing a render output into initial regions (hypertiles). Alternatively, an analysis may be performed to determine how complex a region (hypertile) is or is likely to be. For example, the results of an initial sorting process may be used to determine the number of primitives, or groups of primitives, associated with each initial region (hypertile).

The (expected) complexity of an initial region (hypertile) of a render output may be determined from an analysis of the render output itself, and/or of a previous one or more render outputs. For example, it may be assumed that the complexity of an initial region (hypertile) of a render output will be (likely to be) similar to, or the same as, that of a corresponding initial region (hypertile) of one or more previous render outputs.

Thus, in embodiments, information indicative of the complexity of initial regions (hypertiles) of a (each) render output is stored, and the stored information is used to determine the (likely) complexity of initial regions (hypertiles) of one or more subsequent render outputs. In this case, the complexity of a region (hypertile) of a previous render output may be indicated by the time taken for that region to be processed, e.g. by a tiling unit.

The graphics processor can be any suitable graphics processor that has plural tiling units. The graphics processor may, for example, be a "partitionable" graphics processor that includes plural combinable graphics processing units, e.g. substantially as described in WO 2022/096879.

Thus, the graphics processor may comprise a plurality of graphics processing units, wherein one or more of the graphics processing units are operable in combination with at least one other graphics processing unit of the plurality of graphics processing units; and a control circuit configured to: partition the plurality of graphics processing units into one or more sets (partitions) of one or more graphics processing units, wherein each set (partition) of one or more graphics processing units is operable to generate a render output independently of any other set (partition) of one or more graphics processing units of the one or more sets of one or more graphics processing units; and cause one or more tiling units of the plurality of tiling units to operate in combination with each set (partition) of one or more graphics processing units when generating a render output. The assigning circuit and the control circuit may comprise separate circuits, or may be at least partially formed of shared processing circuits.

In this case, plural, such as all, of the graphics processing units may comprise a respective one of the plurality of tiling units. Plural tiling units may operate in combination in the same partition, or only one tiling unit may operate in each partition. In embodiments, different partitions process different initial regions (hypertiles) of the same render output.

Other arrangements are possible. For example, the graphics processor may not be partitionable, or may not comprise plural combinable graphics processing units.

Once tiling has been completed for a render output, and primitive lists generated, the primitive lists should be, and in embodiments are, used to generate the render output. In embodiments, the graphics processor comprises a rendering circuit that processes primitives to generate rendering tiles of the render output, and a primitive providing circuit (e.g. primitive list reader) that provides to the rendering circuit the primitives that the rendering circuit needs to process to generate a rendering tile. In embodiments, the primitive providing circuit selects primitives listed in primitive lists that need to be processed by the rendering circuit to generate a rendering tile, and provides the selected primitives to the rendering circuit.

The rendering circuit may include a rasteriser and a fragment renderer. In embodiments, the rasteriser receives primitives from the primitive providing circuit (e.g. primitive list reader), rasterises the primitives to fragments, and provides the fragments to the fragment renderer for processing. In embodiments, the fragment renderer is operable to perform fragment rendering to generate rendered fragment data, and may perform any appropriate fragment processing operations in respect of fragments generated by the rasteriser, such as texture mapping, blending, shading, etc. In embodiments, rendered fragment data generated by the fragment renderer is written to a tile buffer. Other arrangements are possible.

The technology described herein can be implemented in any suitable system, such as a suitably configured microprocessor based system. In embodiments, the technology described herein is implemented in a computer and/or micro-processor based system. The technology described herein is in embodiments implemented in a portable device, such as, and in embodiments, a mobile phone or tablet.

The technology described herein is applicable to any suitable form or configuration of graphics processor and graphics processing system, such as graphics processors (and systems) having a "pipelined" arrangement (in which case the graphics processor executes a rendering pipeline).

In embodiments, the various functions of the technology described herein are carried out on a single data processing platform that generates and outputs data, for example for a display device.

As will be appreciated by those skilled in the art, the graphics processing system may include, e.g., and in embodiments, a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and in embodiments does, also execute a driver for the processor and optionally a compiler or compilers for compiling (e.g. shader) programs to be executed by (e.g. an (programmable) execution unit of) the processor.

The processor may also comprise, and/or be in communication with, one or more memories and/or memory devices that store the data described herein, and/or store software (e.g. (shader) program) for performing the processes described herein. The processor may also be in communication with a host microprocessor, and/or with a display for displaying images based on data generated by the processor.

The technology described herein can be used for all forms of input and/or output that a graphics processor may use or generate. For example, the graphics processor may execute a graphics processing pipeline that generates frames for display, render-to-texture outputs, etc. The output data values from the processing are in embodiments exported to external, e.g. main, memory, for storage and use, such as to a frame buffer for a display.

The various functions of the technology described herein can be carried out in any desired and suitable manner. For example, the functions of the technology described herein can be implemented in hardware or software, as desired.

Thus, for example, the various functional elements, stages, and "means" of the technology described herein may comprise a suitable processor or processors, controller or controllers, functional units, circuitry, circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the components of the data processing system can otherwise include any one or more or all of the usual functional units, etc., that such components include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a data processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

As discussed above, in embodiments of the technology described herein, different regions (e.g. hypertiles) of a render output are assigned to different tiling units for processing.

Figure 1:
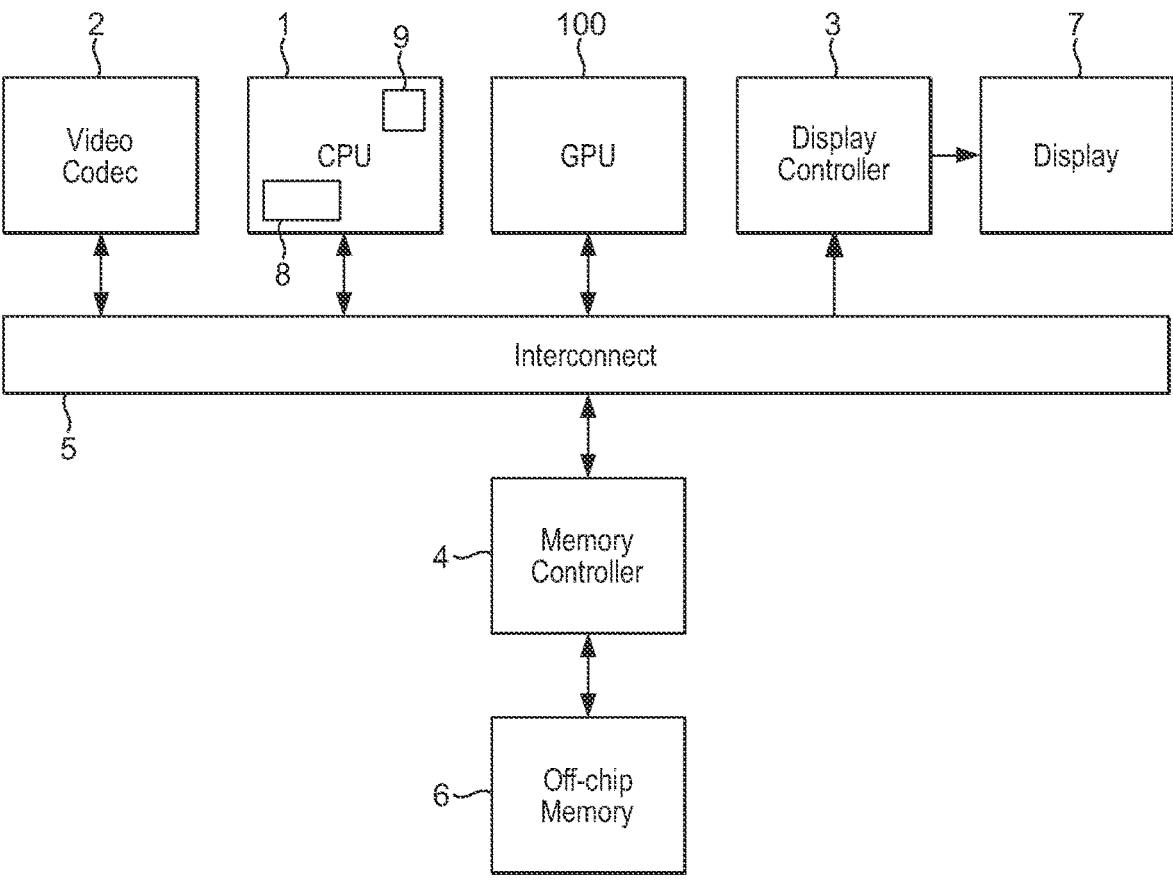
FIG. 1 illustrates a graphics processing system that may be operated in accordance with embodiments of the technology described herein.

FIG. 1 shows an exemplary graphics processing system in which the embodiments of technology described herein may be implemented.

The exemplary graphics processing system shown in FIG. 1 comprises a host processor comprising at least one central processing unit (CPU) 1, a graphics processor (graphics processing unit (GPU)) 100, a video codec 2, a display controller 3, and a memory controller 4. As shown in FIG. 1, these units communicate via an interconnect 5 and have access to an off-chip memory system (memory) 6. In this system, the graphics processor 100, the video codec 2 and/or CPU 1 will generate frames (images) to be displayed and the display controller 3 will then provide frames to a display 7 for display.

In use of this system, an application 8, such as a game, executing on the host processor (CPU) 1 will, for example, require the display of frames on the display 7. To do this the application 8 will send appropriate commands and data to a driver 9 for the graphics processor 100 that is executing on the at least one CPU 1. The driver 9 will then generate appropriate commands and data to cause the graphics processor 100 to render appropriate frames for display and store those frames in appropriate frame buffers, e.g. in main memory 6. The display controller 3 will then read those frames into a buffer for the display from where they are then read out and displayed on the display panel of the display 7.

Figure 2:
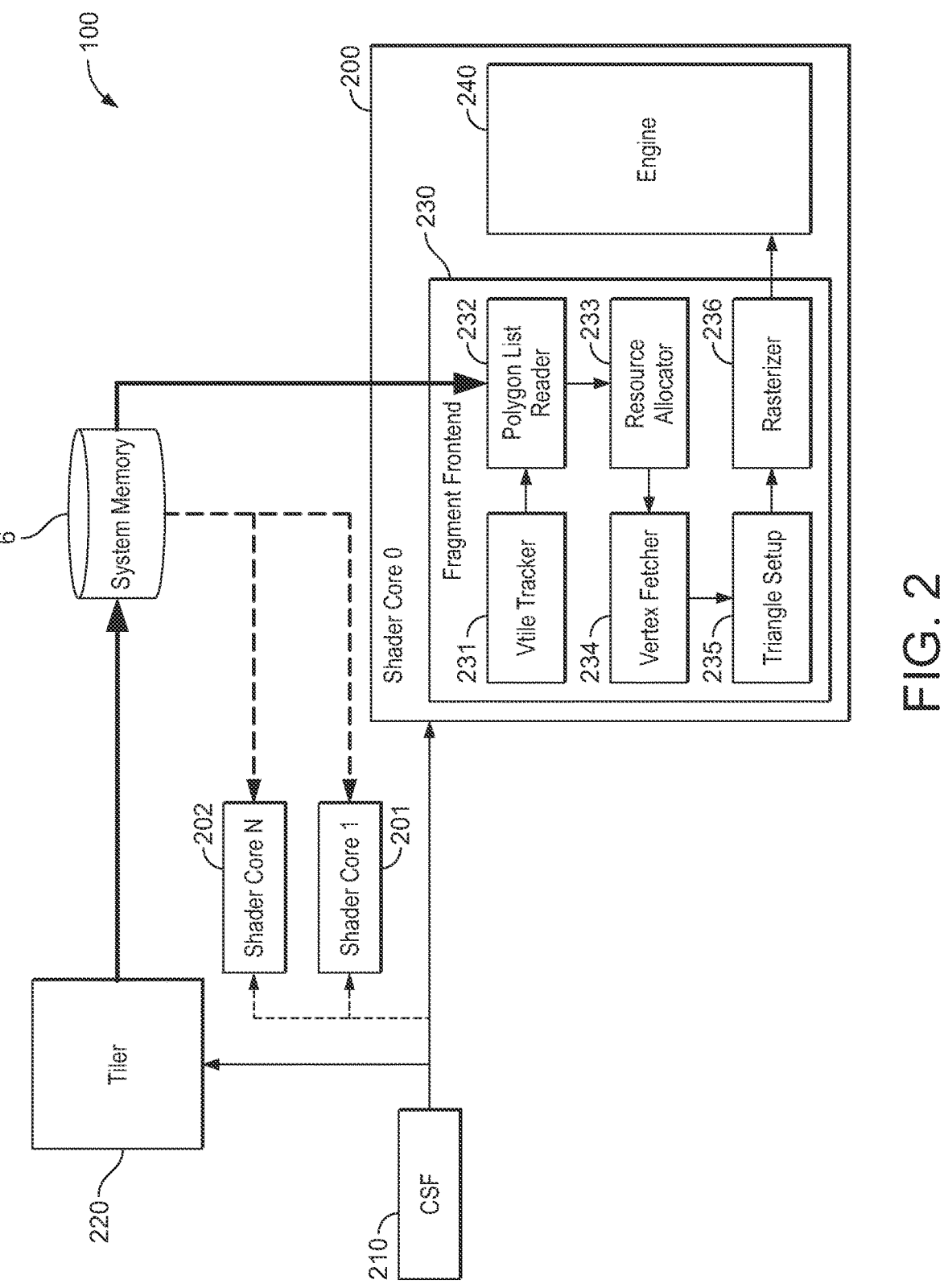
FIG. 2 illustrates an exemplary tile-based graphics processor.

FIG. 2 shows the graphics processor 100 in more detail. FIG. 2 shows the main elements of the graphics processor 100 that are relevant to the operation of the present embodiments. As will be appreciated by those skilled in the art, there may be other elements of the graphics processor that are not illustrated in FIG. 2. It should also be noted that FIG. 2 is only schematic, and that, for example, in practice the shown functional units and pipeline stages may share significant hardware circuits, even though they are shown schematically as separate stages in FIG. 2.

As shown in FIG. 2, the tile-based graphics processor 100 includes a command stream frontend (CSF) 210, a tiler 220, and a set of shader cores 200, 201, 202. FIG. 2 shows three shader cores, but other numbers of shader cores are possible. FIG. 2 illustrates one of the shader cores 200 in greater detail than the others 201, 202, but it will be appreciated that each shader core of the graphics processor 100 may have substantially the same configuration.

The command stream frontend 210 receives commands and data from the driver 9 (directly, or via data structures in memory), and distributes subtasks for execution to the tiling unit 220 and to the shader cores 200, 201, 202 appropriately.

The graphics processor 100 of FIG. 2 is a tile-based graphics processor. In a tile-based rendering system the render output (e.g. frame for display) is divided into a plurality of tiles for rendering. Typically, each tile is 16×16, 32×32, or 64×64 data elements (sampling positions) in size, with the render output being divided into however many such tiles as are required for the render output size and shape that is being used. The tiles are rendered separately to generate the render output. To do this, for each draw call that is received to be processed, it is first necessary to sort the primitives (polygons) for the draw call according to which tiles they should be processed for.

In order to facilitate this, the tiling unit 220 is operable to perform a first processing pass in which lists of primitives to be processed for different regions of the render output are prepared. These "primitive lists" (which can also be referred to as a "tile list" or "polygon list") identify the primitives to be processed for the region in question.

The tiling unit 220 of FIG. 2 is a hierarchical tiler. Thus, as well as the render output being divided into tiles for rendering purposes, the render output is also, in effect, divided into plural sets of progressively larger sub-regions for which separate (different) primitive lists can be and are prepared by the tiling unit 220. The render output is, in effect, overlaid with a progressively increasing hierarchy of render output sub-divisions that the tiling unit 220 can prepare primitive lists for.

In the present example, the tiling unit 220 lists a primitive at only one level of the hierarchy, and selects the hierarchy level at which to list primitives so as to (try to) minimise the number of primitive reads and writes that would be required to render the primitives. Other arrangements are possible. For example, a primitive may be listed at plural levels of the hierarchy. Alternatively, the tiler may be non-hierarchical, and thus may prepare primitives lists only for individual rendering tiles.

As part of this processing pass, the tiler 220 and/or command stream frontend (CSF) 210 may request vertex processing tasks to be performed by the set of shader cores 200, 201, 202 to generate processed (transformed) vertex data that the tiling unit 220 uses to prepare primitive lists. This "vertex shading" operation may comprise, for example, transforming vertex position attributes from the model space that they are initially defined for to the screen space that the output of the graphics processing is to be displayed in.

Once all of the vertex processing and tiling has been completed, the transformed geometry and the primitive lists are written back to the main memory 6, and the first processing pass is complete.

A second processing pass is then performed for the render output, wherein each of the rendering tiles is rendered separately.

In this processing pass, the fragment frontend 230 of a shader core 200 receives fragment processing tasks from the command stream frontend (CSF) 210, and in response, tile tracker 231 schedules the rendering work that the shader core needs to perform in order to generate a tile. Primitive list reader 232 then reads the appropriate primitive list(s) for that tile from the memory 6 to identify the primitives that are to be rendered for the tile.

Resource allocator 233 then configures various elements of the graphics processor 100 for rendering the primitives that the primitive list reader 232 has identified are to be rendered for the tile. For example, the resource allocator 233 may appropriately configure a local tile buffer for storing output data for the tile being rendered.

Vertex fetcher 234 then reads the appropriate processed (transformed) vertex data for primitives to be rendered from the memory 6, and provides the primitives (i.e. their processed vertex data) to triangle set-up unit 235. The triangle set-up unit 235 performs primitive setup operations to setup the primitives to be rendered. This includes determining, from the vertices for the primitives, edge information representing the primitive edges. The edge information for the primitives is then passed to the rasteriser 236.

When the rasteriser 236 receives a graphics primitive for rendering (i.e. including its edge information), it rasterises the primitive to sampling points and generates one or more graphics fragments having appropriate positions (representing appropriate sampling positions) for rendering the primitive.

Fragments generated by the rasteriser 236 may then be subject to "culling" operations, such as depth testing, to see if any fragments can be discarded (culled) at this stage. Execution threads are then issued to execution engine 240 for processing fragments that have survived the culling stage.

The execution engine 240 executes a shader program for each execution thread issued to it to generate appropriate render output data, including colour (red, green and blue, RGB) and transparency (alpha, a) data. The rendering engine 240 may perform fragment processing (rendering) operations such as texture mapping, blending, shading, etc. on the fragments. Output data generated by the execution engine 240 is then written appropriately to the tile buffer.

Once a tile has been processed, its data is exported from the tile buffer to the main memory 6 (e.g. to a frame buffer in the main memory 6) for storage, and the next tile is then processed, and so on, until sufficient tiles have been processed to generate the entire render output (e.g. frame (image) to be displayed). The next render output (e.g. frame) may then be generated, and so on.

Figure 3:
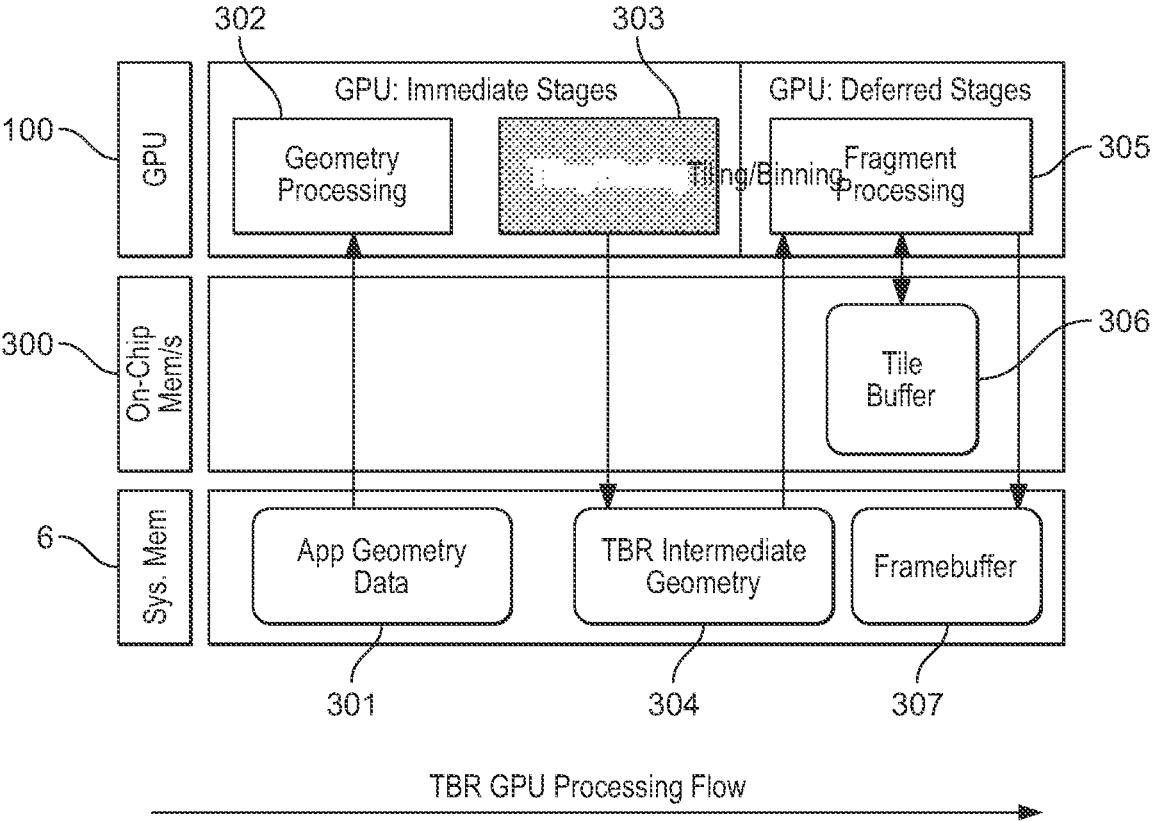
FIG. 3 illustrates a tile-based graphics processing process.

FIG. 3 shows schematically the tile-based rendering process. As shown in FIG. 3, in the first processing pass, the required geometry data 301 for a draw call is read from the external memory system 6 into the graphics processor 100. The primitive vertices are thus obtained and the geometry processing 302 (vertex shading) is performed in order to generate a corresponding set of post-transformed geometry data (e.g. transformed vertices) 304.

The transformed geometry is subject to a tiling operation 303 by the tiling unit 220 of the graphics processor 100, wherein it is determined for each of the primitives which rendering tiles the primitives should be processed for. The tiling unit may also operate to cull primitives that are outside of the view frustrum, or are back facing. In this way, respective primitive lists are generated that indicate which primitives are to be rendered for which of the rendering tiles.

For modern graphics processors, the geometry data for the render output can be relatively large such that it cannot be effectively cached in local storage associated with the graphics processor. Thus, as shown in FIG. 3, once all of the geometry processing for the render output has completed, and the tiling operating has completed, the transformed geometry 304 is written back to the external memory system 6 together with the primitive lists, and the first processing pass is complete.

The second processing pass is then performed wherein each of the rendering tiles is rendered (separately) in turn. Thus, for each rendering tile, it is determined from the respective primitive list(s) which primitives should be processed for that tile, and the associated transformed geometry data 304 for those primitives is read back in from memory 6 and subject to fragment processing 305 to generate the render output.

As shown in FIG. 3, the rendering is performed using a tile buffer 306 that resides in on-chip memory 300. Thus, the rendering of a given tile is performed locally to the graphics processor 100. Once the rendering for the tile has complete, the rendered data is then written out to the external memory 6, e.g. into a frame buffer 307, e.g. for display.

Figure 4:
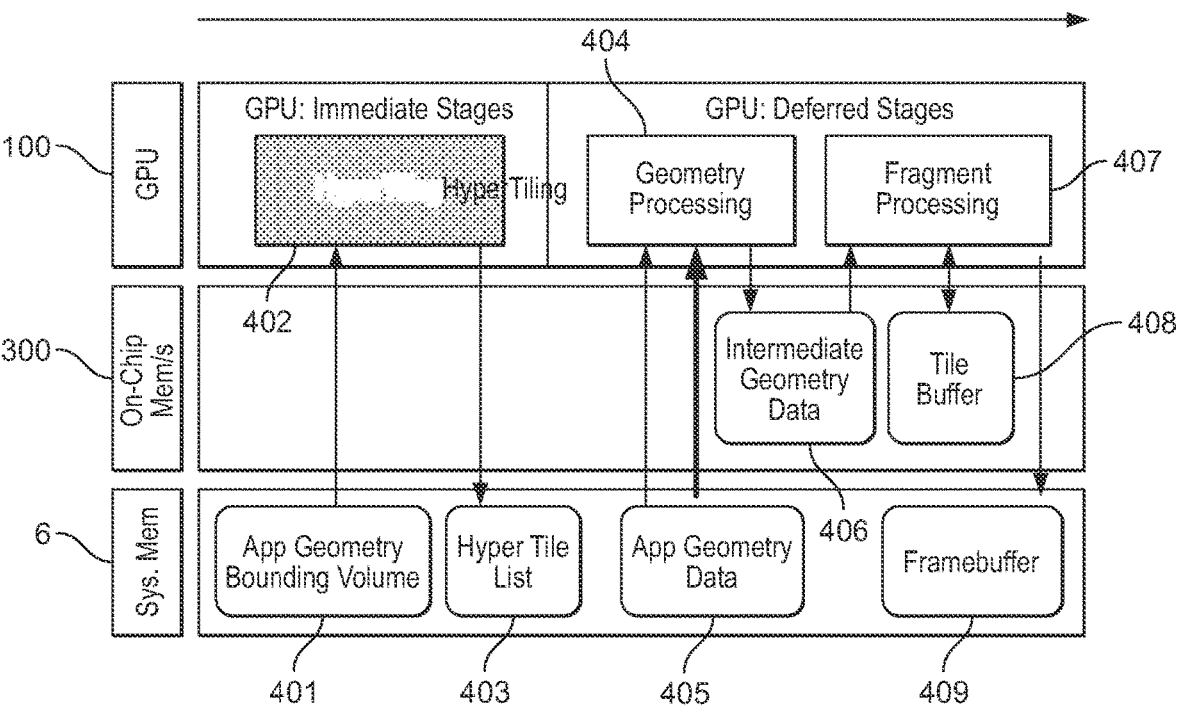
FIG. 4 illustrates a hypertiling graphics processing process.

FIGS. 4 and 5 illustrate a "hypertiling" rendering process, which can facilitate a reduction in memory bandwidth costs associated with transferring geometry data to and from the external memory system 6, as compared to the more traditional tiling arrangement described with reference to FIG. 3. This is achieved by performing an initial relatively coarser sorting of the geometry, that may use a "higher level" representation of the position of a set of geometry to be processed that is provided separately and in addition to the geometry data itself.

In the present example, the higher level representation of the position of the set of geometry is in the form of a bounding box. Furthermore, the render output is divided into a number of relatively larger, e.g. 256×256 sampling position, "hypertiles". These hypertiles are thus larger than the rendering tiles discussed above.

As shown in FIG. 4, in the first processing pass, the bounding box representations of the geometry 401 are read from their location in memory 6 into the graphics processor 100, and an initial sorting (hypertiling) operation 402 is then performed to sort the geometry into respective hypertile lists indicating which geometry should be processed for which hypertiles.

The hypertiling process may include converting bounding boxes from the user (model) space format in which they were initially specified by the application into the desired screen space, and then performing the hypertiling/sorting operation using the transformed bounding boxes. As part of this, it may be determined whether any of the geometry can be discarded at this stage (pre-culled), e.g. by checking whether the bounding box representation falls entirely outside of a desired view frustum.

Once the hypertile lists 403 are generated, they are written back out to external memory 6.

Figure 5A:
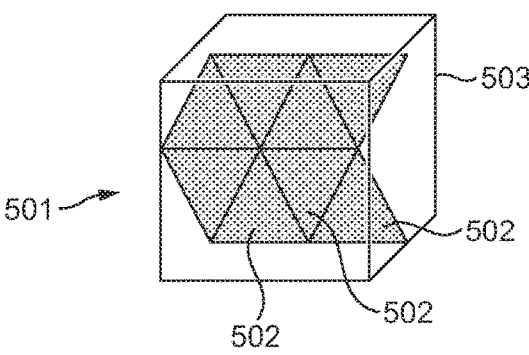
FIG. 5A, FIG. 5B and FIG. 5C illustrate a hypertiling graphics processing process.

FIG. 5 illustrates the hypertiling operation in more detail. FIG. 5A shows schematically an example of a set of geometry 501 which in this case comprises a meshlet of eight connected triangles 502 (and their associated vertices). FIG.

5A also shows a user space bounding box 503 that has been specified by the application for the set of geometry 501 in question. A bounding box shading operation is thus performed to transform the model space bounding box representation into the screen space.

Figure 5B:
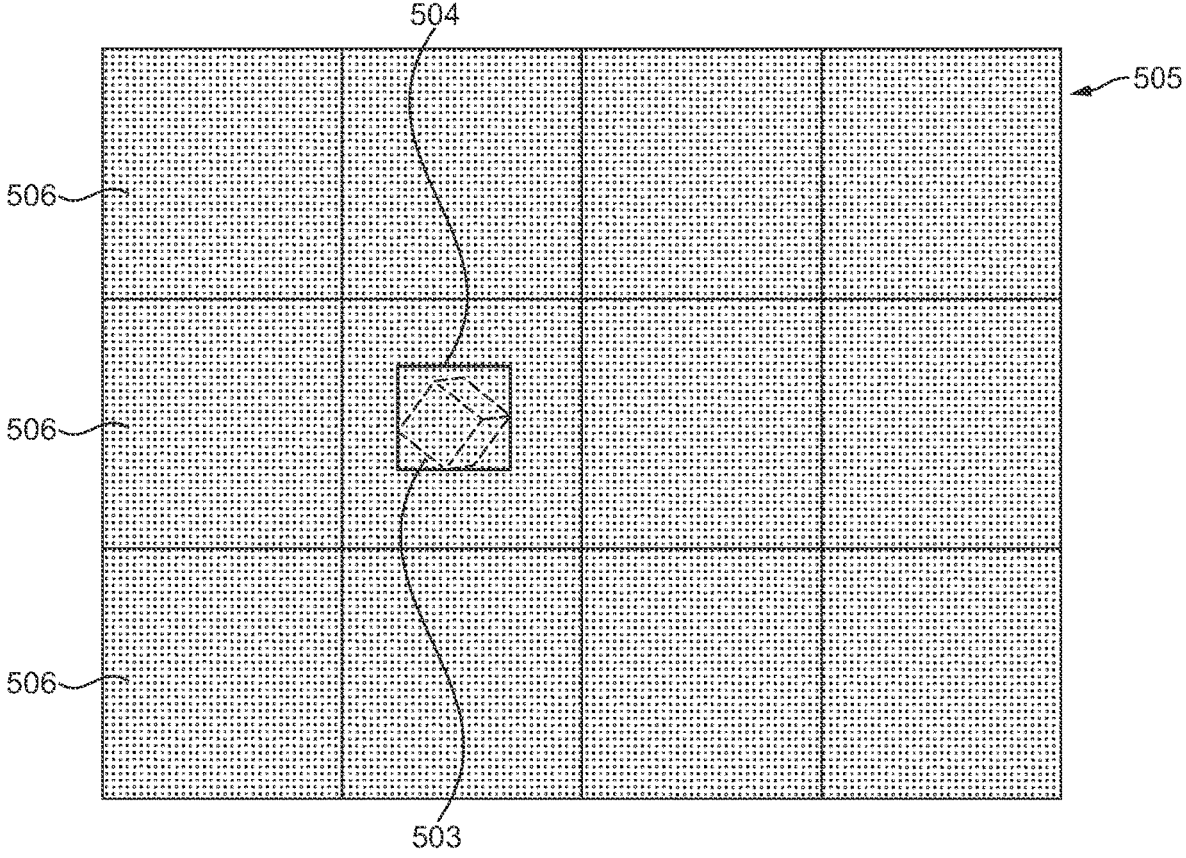

FIG. 5B shows an example of a render output (e.g. frame) 505 that is divided into a grid of rectangular hypertiles 506. FIG. 5B also shows the position of the set of geometry 501 within the render output. In particular, FIG. 5B shows the positions of both the user space bounding box 503 and the transformed screen space bounding box 504 generated from the initial bounding box shading operation.

Figure 5C:
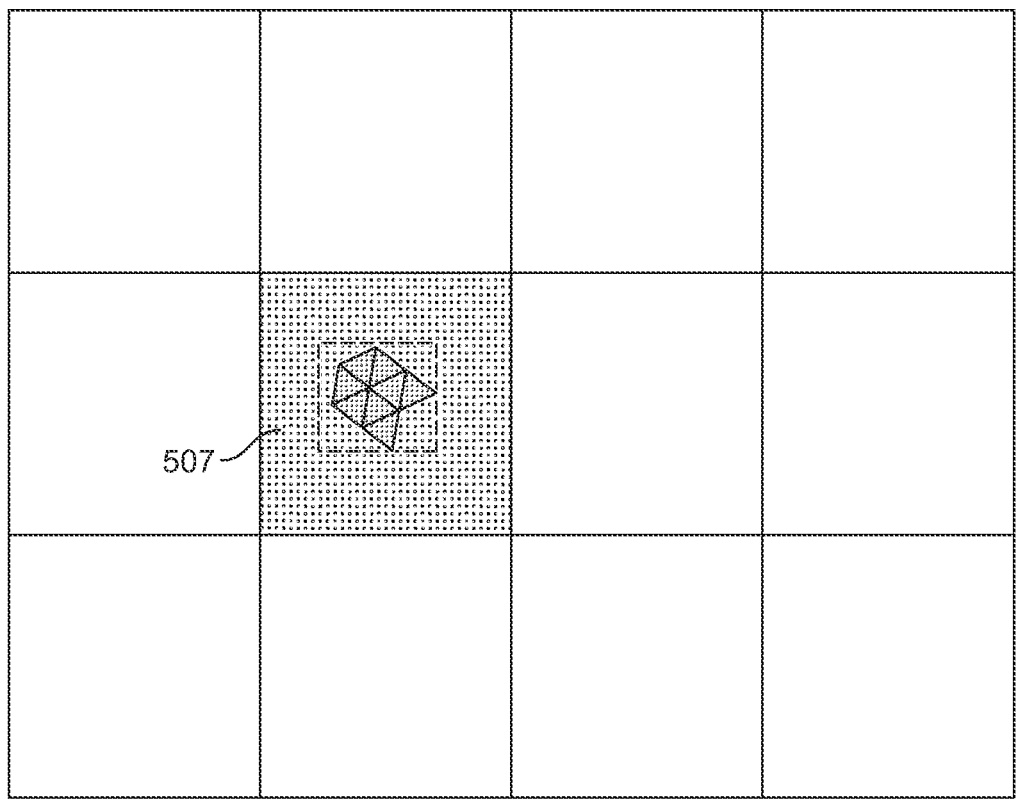

In this example, as shown in FIG. 5C, the transformed bounding box representation fits entirely within a single hypertile 507 and is thus added to the respective hypertile list for that hypertile 507. If, however, a set of geometry falls into multiple hypertiles, the geometry may be added to a respective hypertile list for each hypertile. This hypertiling operation is then repeated for each set of geometry for the draw call in question in order to generate the complete hypertile lists 403.

In contrast to the tile-based rendering scheme of FIG. 3 discussed above, in the hypertile rendering scheme of FIG. 4 the initial sorting is thus performed using only the bounding box representations of the geometry 401 provided by the application. Thus, there is no need at this stage for the graphics processor 100 to read in the geometry data 405.

Instead, once the hypertile lists 403 have been generated, a second processing pass is performed wherein each hypertile is rendered separately. To do this, the graphics processor 100 identifies from the respective hypertile lists 403 which geometry should be processed for a given hypertile, and the required geometry 405 is then read into the graphics processor 100 from the external memory 6.

The geometry processing 404, including the vertex shading, and finer tiling of the geometry into respective rendering tiles into which the hypertile is divided for rendering, is then performed at this stage, and so is, in effect, "deferred" to the second processing pass.

In this way the amount of intermediate geometry data (e.g. the transformed vertices) that is generated instantaneously can be reduced, since only the geometry data for the hypertile (or hypertiles) that are currently being processed needs to be obtained and stored. This means that the intermediate geometry data 406, as well as the tile lists generated from the finer binning of the geometry into rendering tiles can in the present arrangement be stored entirely in the on-chip memory (L2C) 300 (and the size of the hypertiles may be selected to ensure this is the case, e.g. based on the size of the on-chip memory 300).

The rendering of the hypertiles can then proceed, e.g. in substantially the same manner described above. Thus, the intermediate geometry data 406, including the tile lists, is read into the graphics processor 100 and the fragment processing 407 is performed by one or more of the shader cores using the tile buffer 408 in a similar fashion as described above, with the rendered data being written into a suitable frame buffer 409 in external memory 6, e.g. for subsequent display.

Thus, the processing for each hypertile involves first reading in the hypertile list from memory 6, and then performing the geometry processing (e.g. vertex shading, etc.) and a per primitive tiling operation wherein the primitives are sorted into rendering tiles. The fragment processing is then performed as described above in a further processing pass to render the tiles.

Thus, there are in effect two sorting operations: a first, (higher level) hypertiling operation to sort the geometry into the hypertiles, and a second, (finer) tiling operation to sort the primitives into the respective rendering tiles.

Further features of the hypertiling process may be as described in WO 2022/084666.

It has been recognised that as desired rendering tasks become larger and more complex, the tiling process becomes correspondingly more complex. Similarly, as desired frame rates increase, the time available to complete the tiling process decreases. One way of dealing with increasing demands on the tiling unit is to increase its size (i.e. processing capacity). However, the inventors have recognised that this can result in a reduction in the efficiency with which smaller tile-based rendering tasks are performed.

In embodiments of the technology described herein, a graphics processor is provided with a plurality of separate tiling units. Each of the tiling units may be selectively activatable, and can operate in combination with one or more of the other tiling units to prepare primitive lists, such that, for example, only one or some of the tiling units can operate to perform a relatively simple rendering task, and more, such as all, of the tiling units can operate together to perform a more complex rendering task. This can then allow the graphics processor to efficiently handle both complex and simple tile-based rendering tasks.

Figure 6:
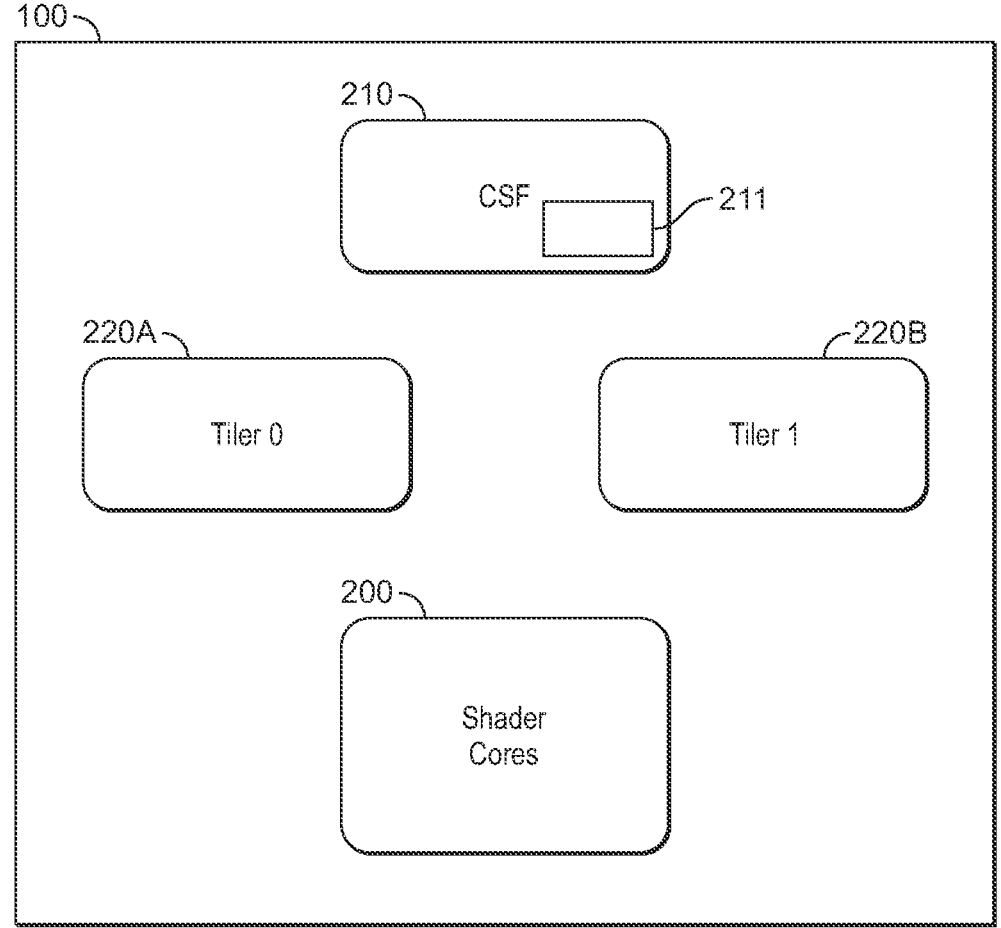
FIG. 6 illustrates a graphics processor that may be operated in accordance with embodiments of the technology described herein.

FIG. 6 illustrates a graphics processor 100 according to an embodiment that includes two tiling units 220A, 220B. More than two tiling units would be possible. In this embodiment, command stream frontend (CSF) 210 can either activate only one of the tiling units 220A, 220B to operate by itself to prepare primitive lists for a render output (e.g. frame for display), or activate both of the tiling units 220A, 220B to operate together to prepare primitive lists for the same render output (e.g. frame for display).

Figure 7:
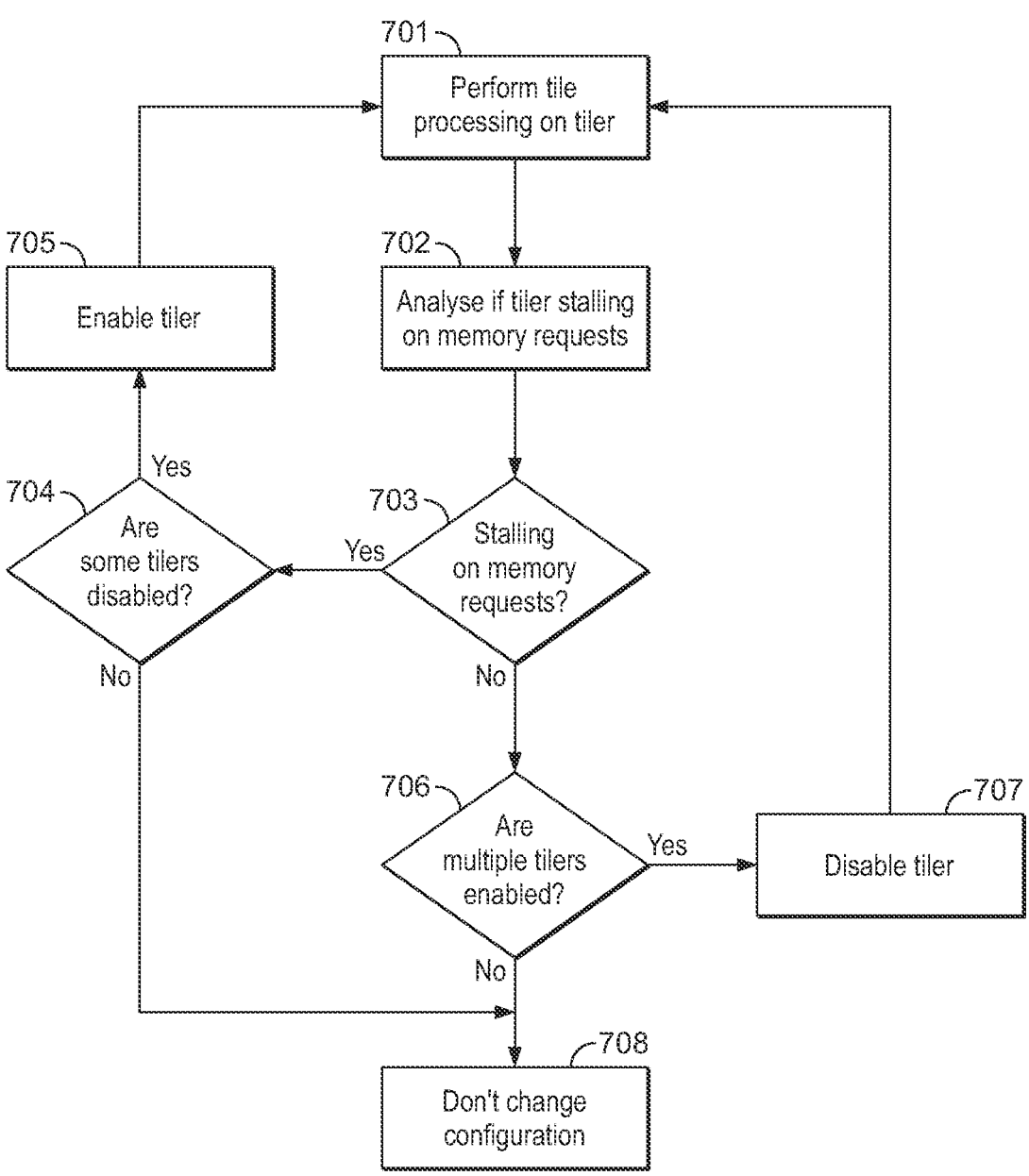
FIG. 7 illustrates adaptively varying the number of active tiling units in accordance with embodiments of the technology described herein.

For example, FIG. 7 illustrates a process by which the number of tiling units activated can be adaptively varied. As shown in FIG. 7, the tiling process is performed for a frame (step 701), and it is determined whether stalling occurs (steps 702, 703). If stalling occurs, and at least one tiler is disabled (step 704), another tiler is enabled (step 705), and the next frame is thus processed with more tiling units activated. If stalling does not occur, and multiple tilers are enabled (step 706), a tiler is disabled (step 707), and the next frame is thus processed with fewer tiling units activated. If stalling occurs and all tilers are enabled, or if stalling does not occur and only one tiler is enabled, no change is made (step 708), and the next frame is thus processed with the same number of tiling units activated.

Returning to FIG. 6, to facilitate the use of plural tiling unit units, the command stream frontend (CSF) 210 includes a tiler iterator 211 (assigning circuit) that can distribute tiling tasks to the plural tiling units 220A, 220B. Although FIG. 6 shows tiler iterator 211 as being part of the command stream frontend (CSF) 210, in other embodiments, the tiler iterator 211 is a separate processing unit of the graphics processor 100. In this case, the tiler iterator 211 may, for example, appear to, and interact with, the command stream frontend (CSF) 210 as if it were a tiling unit. In other embodiments, the tiler iterator 211 is part of a master tiling unit that can distribute tasks to one or more slave tiling units.

In embodiments of the technology described herein, the tiler iterator 211 splits an overall tiling task for a render output (e.g. frame) between different tiling units by assigning different hypertiles to different tiling units for processing. Thus, for example, a first hypertile of the render output is assigned to one of the tiling units 220A, 220B, and a second hypertile of the render output is assigned to the other of the tiling units 220A, 220B. This allows plural tiling units to efficiently work together on the same rendering task.

Figure 8A:
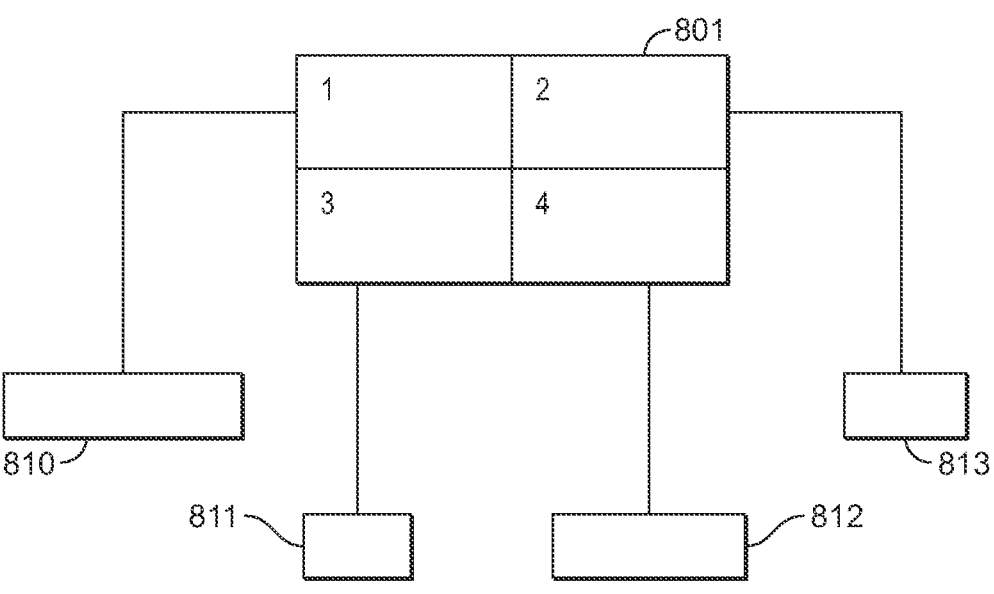
FIG. 8A and FIG. 8B illustrate hypertiling in accordance with embodiments of the technology described herein.

For example, FIG. 8A illustrates a render output 801 divided into four hypertiles. It will be appreciated that other numbers, shapes, sizes, etc. of hypertiles are possible. In this embodiment, the hypertiling process sorts the primitives of a draw call into the four hypertiles, and thereby generates a hypertile list 810-813 for each of the hypertiles that indicates which primitives of the draw call are covered by the hypertile in question. The tiling unit assigned to process a hypertile then accesses the appropriate hypertile list 810-813 to determine which primitives need to be subjected to the tiling process for the hypertile in question.

Figure 8B:
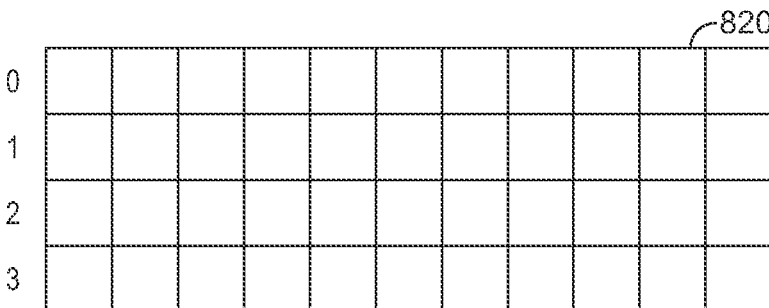

FIG. 8B illustrates another embodiment in which the hypertiling process generates a single data structure 820 that indicates which primitives of a draw call are covered by which hypertiles, and tiling units access the same single data structure for all of the hypertiles. As illustrated in FIG. 8B, the data structure 820 is in the form of a bitmap, comprising a bit (flag) for each primitive for each hypertile. Other arrangements are possible.

Figure 9:
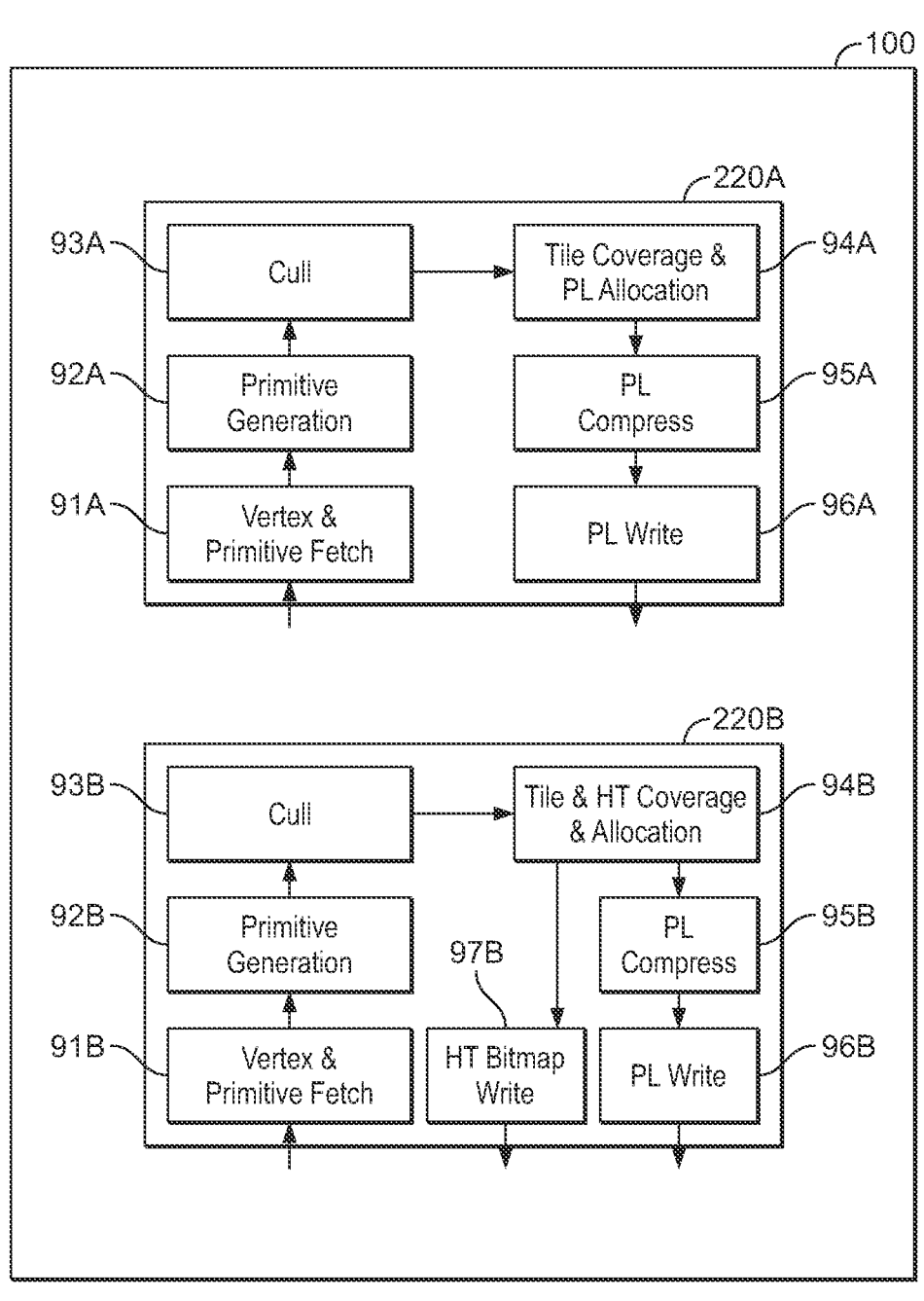
FIG. 9 illustrates a graphics processor that may be operated in accordance with embodiments of the technology described herein.

The hypertiling process may be performed by shader cores 200 executing an appropriate shader program. Alternatively, the hypertiling process may be performed by a tiling unit. For example, FIG. 9 illustrates a graphics processor 100 that has two tiling units 220A, 220B. In this embodiment, the first tiling unit 220A is operable only to perform tiling, e.g. in the usual manner for a tiling unit. The second tiling unit 220B, however, can operate in two different modes of operation: a tiling mode in which primitive lists are generated, and a hypertiling mode in which a hypertile bitmap (or hypertile lists) is generated.

Thus, as shown in FIG. 9, the first tiling unit 220A executes a pipeline that includes a vertex and primitive fetching stage 91A in which geometry data is fetched from memory 6. There is then a primitive assembly 92A stage in which primitives are assembled, and a culling 93A stage in which it is determined whether any of the primitives can be culled from further processing. Primitives that pass the culling stage 93A are provided to a binning stage 94A which prepares primitive lists. Compression stage 95A then compresses the primitives lists, and write stage 96A writes the compressed primitive lists to memory 6.

As shown in FIG. 9, the second tiling unit 220B executes a pipeline that again includes a geometry fetching 91B, primitive assembly 92B, and culling 93B stages. There is then a binning stage 94B which can either generate primitive lists or generate a hypertile bitmap. In tiling mode, the binning stage 94B generates primitive lists, compression stage 95B compresses the primitives lists, and primitive list write stage 96B writes the compressed primitive lists to memory 6. In hypertiling mode, binning stage 94B generates a hypertile bitmap, and hypertile bitmap write stage 97B writes the hypertile bitmap to memory 6.

A rendering process in accordance with embodiments of the technology described herein will now be described with reference to FIG. 10.

In this embodiment, the application provides a "higher level" representation of the position of a set of geometry to be processed, as discussed above with reference to FIG. 4. As shown in FIG. 10, in a first processing pass, as in the process of FIG. 4, the bounding box representations of the geometry 1001 are read from their location in memory 6 into the graphics processor 100, and an initial sorting ("hypertiling") operation 1002 is then performed to sort the geometry into respective hypertile lists indicating which geometry should be processed for which hypertiles. The hypertile lists 1003 are then written back out to external memory 6.

In this embodiment, the hypertile lists 1003 comprise, for each hypertile, a list of the bounding boxes that appear in that hypertile. Alternatively, an array, e.g. bitmap, that indicates whether or not each bounding box appears in each hypertile may be generated (e.g., substantially as discussed above).

Once the hypertile lists 1003 have been generated, a second processing pass is performed wherein each hypertile is rendered separately.

In contrast to the rendering scheme of FIG. 4 discussed above, in the embodiment of FIG. 10, iterator 211 assigns different hypertiles to different tiling units of the graphics processor 100 for processing. FIG. 10 illustrates two different tiling units 220A, 220B to which different hypertiles of the same render output can be assigned. Other numbers of tiling units are possible.

Each tiling unit 220A, 220B identifies from the respective hypertile lists 1003 which geometry should be processed for a hypertile that has been assigned to it, and reads in the required geometry 1005 from the external memory 6. The geometry processing, including the vertex shading, and finer tiling of the geometry into respective rendering tiles into which the hypertile is divided for rendering, may then be performed. The resulting intermediate geometry data 1006, as well as the tile lists generated from the finer binning of the geometry into rendering tiles, is then written to external memory 6, and the second processing pass is complete.

A third processing pass is then performed wherein each of the rendering tiles is rendered (separately) in turn. Thus, for each rendering tile, it is determined from the respective primitive list(s) which primitives should be processed for that tile, and the associated transformed geometry data 1006 for those primitives is read back in from memory 6 and subject to rasterisation and fragment processing 1007 to generate the render output.

Figure 10:
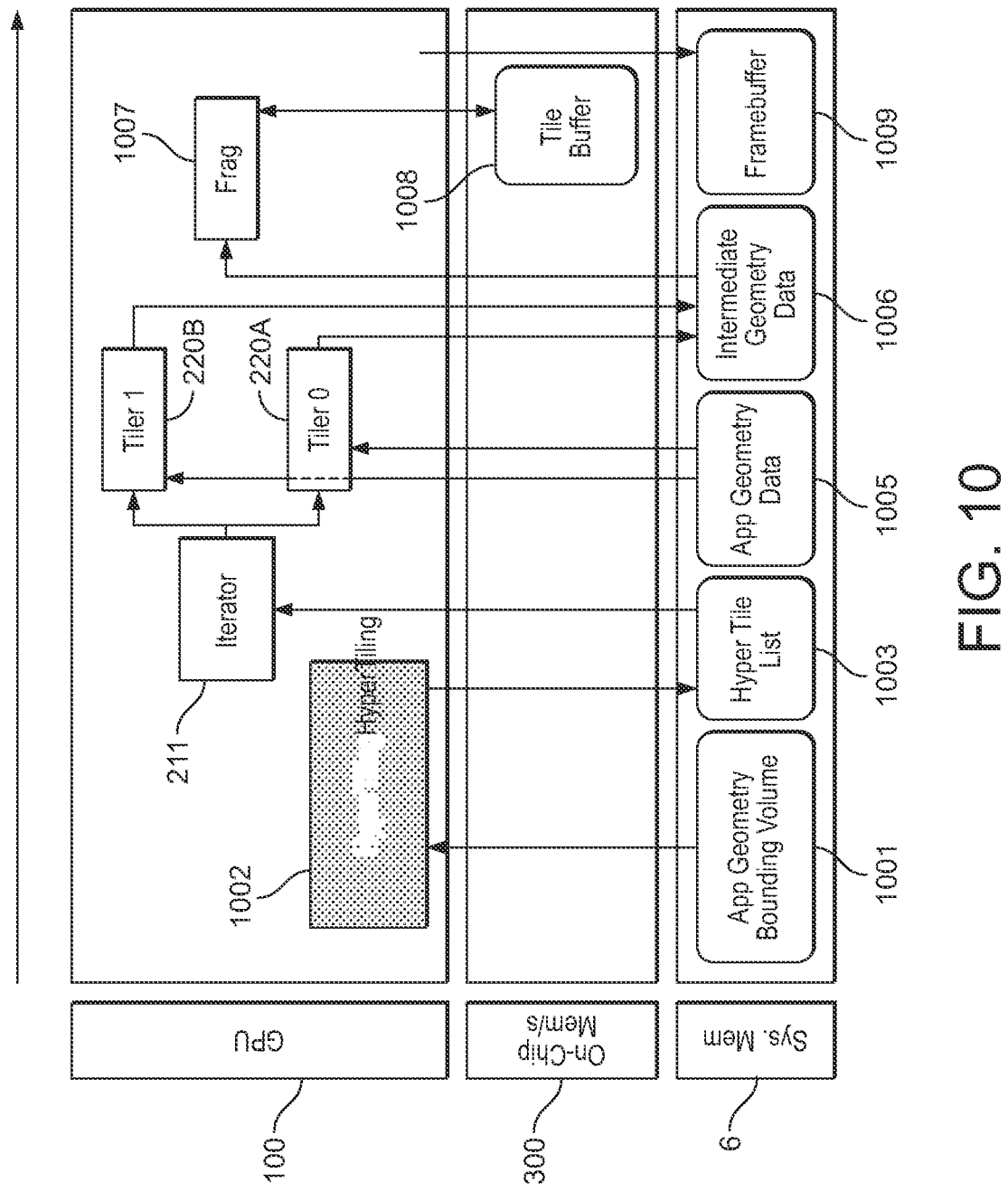
FIG. 10 illustrates a graphics processing process in accordance with embodiments of the technology described herein.

As shown in FIG. 10, the rendering is performed using a tile buffer 1008 that resides in on-chip memory 300. Thus, the rendering of a given tile is performed locally to the graphics processor 100. Once the rendering for the tile has complete, the rendered data is then written out to the external memory 6, e.g. into a frame buffer 1009, e.g. for display.

FIGS. 11, 12A and 12B illustrate another embodiment of a graphics processor that has multiple tiling units. In this embodiment, the graphics processor includes plural connected graphics processing units, and different sets of one or more of those graphics processing units, i.e. different "partitions", can operate independently of each other. Such a graphics processor may be particularly suited to automotive applications, for example. For example, a respective partition may be assigned for each of one or more of: a display screen for the main instrument console, an additional navigation and/or entertainment screen, and an Advanced Driver Assistance System (ADAS) of a vehicle, etc.

As shown in FIG. 11, in this embodiment, the graphics processor 100 includes eight connected tile-based graphics processing units (GPUs) 10-17. Other numbers of connected graphics processing units would be possible. It will also be appreciated here that FIG. 11 is only schematic, and the system may include other units and components not shown in FIG. 11.

In this system, the driver 9 sends commands and data for graphics processing tasks to the set of graphics processing units 100 for processing by some or all of the graphics processing units (GPUs) 10-17 to generate the desired data processing output. The partition manager 101 receives commands and data from the driver 9, and in response, configures the system appropriately to cause GPUs to operate in a standalone mode, or to be linked up with one or more other GPUs to work cooperatively on a given task.

In standalone mode, a GPU operates independently, e.g. under direct control from the host processor 1. In linked operation, one of the GPUs operates in a master mode and one or more other GPUs operate in a slave mode. In master mode the GPU controls the other GPU(s) operating in slave mode, and provides the software interface (the host processor interface) for the linked set of GPUs. In slave mode, the GPU operates under control of the master GPU.

This allows the set of graphics processing units 100 to be used in different situations, either as effectively plural separate GPUs executing different functions, or with the GPUs linked to execute a single function with higher performance. For example, one or more GPUs may operate as a first partition and generate a frame for display on a first display, e.g. under the control of a first application, while one or more other GPUs are operating as a second, independent partition that is generating a different frame for display on a different display, e.g. under the control of a second, different application. Alternatively, all of the GPUs may operate in combination as a single partition to generate the same frame for display on a single display, e.g. under the control of a single application.

As shown in FIG. 11, the partition manager 101 is connected to each GPU 10-17 via a respective configuration connection 60-67. The configuration connections 60-67 are used by the partition controller 101 to configure the GPUs 10-17 to operate in the desired modes of operation.

As shown in FIG. 11, GPUs include a respective (task) management circuit in the form of a job manager 40, 42-47 that can provide a software interface for a respective partition, and thus receive tasks (commands and data) from a driver 9, and distribute subtasks for execution to a respective tiling unit 20, 22-27 and/or to a respective set of shader cores 50-57. Each graphics processing unit in this embodiment comprises a set of three shader cores. Other numbers of shader cores would be possible.

As shown in FIG. 11, each graphics processing unit (GPU) 10-17 further includes a local L2 cache (L2C) which may store output data locally in a tile buffer. FIG. 8 shows each graphics processing unit (GPU) 10-17 having its own local L2 cache (L2C), but the graphics processing units (GPUs) 10-17 may all have access to the same shared L2 cache. Output data can be output from L2 cache (L2C) to a frame buffer in an external memory 6 for display, via a memory interface 70-77 under the control of a memory management unit (MMU).

As shown in FIG. 11, in the present embodiment, the eight graphics processing units 10-17 are "daisy-chained" together. Each graphics processing unit 10-17 comprises a respective interconnect 30-37 that is connected to the interconnect of the adjacent graphics processing unit(s) in the daisy-chain sequence.

The operating mode of a GPU 10-17 (standalone, master or slave mode) is set (enabled and disabled) by configuring it's interconnect 30-37 appropriately. For example, when a GPU is to operate in standalone mode, it's interconnect is configured to prevent communication with other graphics processing units. Correspondingly, when a GPU is to act as a master or slave, it's interconnect is configured to allow communication with one or two connected GPUs, as appropriate.

Moreover, when a GPU is operating in master or stand-alone mode, the GPU's job manager will operate to distribute tasks appropriately, and the GPU's tiling unit will operate to prepare primitive lists as appropriate. When a GPU is operating in slave mode, however, its job manager and tiling unit will typically be disabled.

FIG. 12A illustrates an example in which two GPUs operate separately in standalone mode, and FIG. 12B illustrates an example in which the two GPUs operate together in linked mode.

As shown in FIG. 12A, in the standalone mode case, the first GPU acts as a first partition 110, and the second GPU acts as a second partition 111. The job manager 40, 41 of each GPU provides the software interface for the respective partition, and thus receives tasks (commands and data) from a driver, and divides a task given by the driver into subtasks and distributes the subtasks for execution to a respective tiling unit 20, 21 and set of shader cores 50, 51. Both job managers 40, 41 may receive tasks from the same driver 9, or there could be a different driver for each partition. As shown in FIG. 12A, in the standalone mode case, each tiling unit 20, 21 operates in combination with the respective set of shader cores 50, 51 of the respective GPU.

FIG. 12B illustrates the case where both GPUs act in combination as a single partition 112. In the present embodiment, the first GPU acts as the master (primary) graphics processing unit, while the second GPU acts as a slave (secondary) graphics processing unit. In this case, the job manager 40 of the first, master graphics processing unit provides the software interface for both GPUs, and thus receives tasks from a driver, and distributes subtasks to both sets of shader cores 50, 51. The job manager 41 of the second, slave GPU is accordingly disabled. Similarly, in this mode of operation, the tiling unit 20 of the first, master GPU will operate in combination with both sets of shader cores 50, 51, while the tiling unit 21 of the second, slave GPU is disabled.

In this example, the tiling unit 20 of the first GPU will accordingly need to be provided with a processing capacity that is sufficient to prepare primitive lists at a fast enough rate for operating in combination with both sets of shader cores 50, 51 combined, while the tiling unit 21 of the second GPU will only need to be provided with a processing capacity that is sufficient to prepare primitive lists at a fast enough rate for operating in combination with one of the sets of shader cores 51.

Accordingly, in this example, as shown in FIG. 12, the tiling unit 21 of the second GPU is provided with a smaller (maximum) processing (e.g. buffer) capacity than the tiling unit 20 of the first GPU. Similarly, in the embodiment shown in FIG. 11, the system includes three "large" tiling units 20, 24, 25, and four "small" tiling units 22, 23, 26, 27. Furthermore, one GPU 11 does not have a tiling unit, as it only ever operates in slave mode. Other arrangements are possible. For example, different distributions and/or sizes of tiling units could be used. For example, all of the GPUs could have tiling units that have the same processing capacity.

Further features of the system may be as described in WO 2022/096879.

A rendering process in accordance with the present embodiment will now be described with reference to FIG. 13.

In this embodiment, as in the embodiment of FIG. 10, the application provides (or the driver 9 generates) a "higher level" representation of the position of a set of geometry to be processed, as discussed above. As shown in FIG. 13, in a first processing pass, the bounding box representations of the geometry 1301 are read from their location in memory 6 into the graphics processor 100, and an initial sorting ("hypertiling") operation 1302 is then performed to sort the geometry into respective hypertile lists (or a bitmap) indicating which geometry should be processed for which hypertiles. The hypertile lists 1303 are then written back out to external memory 6.

Once the hypertile lists 1303 have been generated, a second processing pass is performed wherein each hypertile is rendered separately.

In contrast to rendering schemes discussed above, in the embodiment of FIG. 13, different hypertiles are assigned to different partitions of the graphics processor 100 for processing. For example, FIG. 13 illustrates three different partitions 113, 114, 115 to which different hypertiles of the same render output can be assigned. Other numbers of partitions are possible.

Thus, under control of the partition manager 101, each partition 113, 114, 115 identifies from the respective hypertile lists 1303 which geometry should be processed for a hypertile that has been assigned to it, and reads in the required geometry 1305 from the external memory 6. Each partition then performs the geometry processing, including the vertex shading, and finer tiling of the geometry into respective rendering tiles into which the hypertile is divided for rendering. The resulting intermediate geometry data 1306, as well as the tile lists generated from the finer binning of the geometry into rendering tiles, is then stored in on-chip memory (L2C) 300. Alternatively, the transformed geometry data and/or the tile lists 1306 may be stored in external memory 6.

Each partition then reads in the intermediate geometry data 1306, including the tile lists, and perform the fragment processing using a tile buffer 1308, as described above. The rendered data is then written into a suitable frame buffer 1309 in external memory 6, e.g. for subsequent display.

As discussed above, since each partition 113, 114, 115 includes a respective tiling unit of the graphics processor 100, the finer tiling process can accordingly be performed for different hypertiles using different tiling units in different partitions. Again, this allows plural tiling units of the graphics processor 100 to efficiently work together to generate the same render output (e.g. frame for display).

FIG. 14 illustrates a rendering process in accordance with another embodiment. In this embodiment, the application provides geometry data 1401, but does not provide a "higher level" representation of the geometry. Thus, in this embodiment, as shown in FIG. 14, the initial sorting ("hypertiling") operation 1402 is performed using the geometry data 1401 itself (and not using a higher level representation thereof).

In this case, the hypertiling process 1402 includes converting the geometry from the model space format in which it was initially specified by the application into the desired screen space (vertex shading), and then performing the hypertiling sorting operation using the transformed geometry data. The hypertiling sorting operation 1402 sorts the geometry into respective hypertile lists (or a bitmap) indicating which geometry should be processed for which hypertiles. The hypertile lists are then written back out to external memory 6, together with the transformed (vertex shaded) geometry 1403.

Once the hypertile lists and transformed geometry 1403 have been generated, a second processing pass is performed wherein each hypertile is rendered separately. As described above, different hypertiles are assigned to different partitions of the graphics processor 100 for processing. FIG. 14 again illustrates three different partitions 113, 114, 115 to which different hypertiles of the same render output can be assigned. Other numbers of partitions are possible.

Under control of partition manager 101, each partition 113, 114, 115 identifies from the respective hypertile lists 1403 which geometry should be processed for a hypertile that has been assigned to it, and reads in the required transformed geometry from the external memory 6. The tiling unit of each partition then performs the finer tiling of the transformed geometry into respective rendering tiles into which the hypertile is divided for rendering. The resulting tile lists are then be stored in on-chip memory (L2C) 300. Alternatively, the tile lists 1406 may be stored in external memory 6, e.g. together with the transformed geometry data 1403.

Each partition then reads in the transformed geometry data and tile lists, and performs the fragment processing using a tile buffer 1408, e.g. as described above. The rendered data is then written into a suitable frame buffer 1409 in external memory 6, e.g. for subsequent display.

It will be appreciated that in this embodiment, transformed (vertex shaded) geometry generated in the first (hypertiling) processing pass is written out to memory, so that it can then "re-used" in the second processing pass. However, in other embodiments, the transformed (vertex shaded) geometry generated in the first (hypertiling) processing pass is effectively discarded, and instead, the transformed (vertex shaded) geometry is re-calculated in the second processing pass. Other arrangements are possible.

Hypertiles can be assigned to partitions/tiling units of the graphics processor 100 in any suitable manner. The hypertiles of a render output may be evenly divided between partitions/tiling units. For example, a render output may be divided into the same number of hypertiles as there are partitions or tiling units in the graphics processor 100, and one hypertile of the render output may be assigned to each of the partitions or tiling units. Where there are more hypertiles than partitions or tiling units, some or all of the partitions or tiling units may process plural hypertiles of the same render output.

The iterator 211 or partition manager 101 (assigning circuit) may operate in accordance with a scheduling scheme that attempts to achieve load balancing between the different tiling units. For example, FIG. 15 illustrates an allocation process in which hypertiles of a render output are initially assigned to partitions/tiling units until all partitions/tiling units are active (steps 1501-1503). If there are any hypertiles of the render output remaining to be assigned, each remaining hypertile is assigned to the first partition/tiling unit to become available (steps 1504-1506).

Where the graphics processor 100 includes tiling units that have different processing (e.g. buffer) capacities (e.g. as described above), the tiling unit processing capacities may be taken into account when deciding which partitions/tiling units to assign to which hypertiles. For example, more or larger hypertiles may be assigned to a tiling unit with a larger processing capacity. The number and/or size of hypertiles may be assigned in proportion to tiling unit processing capacities.

The iterator 211 or partition manager 101 (assigning circuit) may preferentially select a higher processing capacity tiling unit to process a hypertile comprising relatively more complex geometry. For example, a hypertile having a longer hypertile list may be assigned to a higher processing capacity tiling unit than a hypertile having a shorter hypertile list, etc.

FIGS. 16A and 16B illustrate a process in which information from previous frames is used when deciding which partitions/tiling units to assign to which hypertiles. As shown in FIG. 16A, a hypertile is processed (step 1601), and a degree of complexity for the hypertile is determined (step 1602) and stored (step 1603), and the process is repeated for each hypertile of a frame (steps 1604, 1605). A degree of complexity for a hypertile may, for example, correspond to the time taken to process that hypertile. Other complexity metrics are possible.

Then, as shown in FIG. 16B, when a hypertile of a new frame is to be assigned to a partition/tiling unit, the complexity information stored for the corresponding hypertile of a previous frame is determined (step 1611), and used as an indication of how complex the new hypertile is likely to be (step 1612).

Additionally or alternatively, a render output may be divided into hypertiles based on the expected complexity of the resulting hypertiles. For example, in the case of a render output comprising a relatively simple region (e.g. sky), a relatively large hypertile encompassing the simple region (e.g. sky) may be used.

As shown in FIG. 16C, complexity information stored for all of the hypertiles of a previous frame may be analysed (step 1621), and the results of the analysis used to determine whether the division of a new frame into hypertiles should be performed differently to, or the same as, the previous frame (step 1622). For example, if it is determined that the hypertiles of the previous frame all have a (sufficiently) similar degree of complexity, the next frame may be divided into hypertiles in the same way. If it is determined that the hypertiles of the previous frame do not have a (sufficiently) similar degree of complexity, the next frame may be divided into hypertiles in a different way, e.g. that is expected to result in hypertiles that all have a similar degree of complexity.

It will be appreciated from the above that the technology described herein, in its embodiments at least, provides arrangements in which multiple tilers can cooperate to generate the same render output. This is achieved, in the embodiments of the technology described herein at least, by dividing the tiling task for a render output between different tiling units on the basis of render output regions.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a tiled-based graphics processor that comprises a plurality of tiling units operable to sort geometry to be processed to generate a render output into primitive listing regions that the render output is divided into; the method comprising:

performing an initial sorting operation that comprises sorting geometry to be processed to generate a render output into a set of initial regions that the render output is divided into, wherein each initial region of the set of initial regions encompasses plural primitive listing regions; and for each of one or more initial regions of the set of initial regions:

assigning a tiling unit of the plurality of tiling units to sort geometry for the respective initial region into primitive listing regions that the respective initial region encompasses; and the assigned tiling unit performing a subsequent sorting operation that comprises sorting the geometry for the respective initial region into the primitive listing regions that the respective initial region encompasses.

2. The method of claim 1, comprising:

assigning a first tiling unit of the plurality of tiling units to sort geometry for a first initial region of the set of initial regions, and the first tiling unit performing a first subsequent sorting operation that comprises sorting the geometry for the first initial region; and assigning a second, different tiling unit of the plurality of tiling units to sort geometry for a second, different initial region of the set of initial regions, and the second tiling unit performing a second subsequent sorting operation that comprises sorting the geometry for the second initial region.

3. The method of claim 1, wherein:

performing the initial sorting operation comprises generating transformed geometry data, and using the transformed geometry data to sort the geometry into the set of initial regions; and a tiling unit performing a subsequent sorting operation comprises the tiling unit processing the transformed geometry data.

4. The method of claim 1, wherein performing the initial sorting operation to sort the geometry into the set of initial regions comprises processing a simplified representation of the geometry.

5. The method of claim 1, wherein the plurality of tiling units comprises tiling units having different processing capacities; and the method comprises:

assigning a tiling unit to sort geometry for an initial region of the set of initial regions based on a processing capacity of the tiling unit.

6. The method of claim 1, comprising assigning a tiling unit to sort geometry for an initial region of the set of initial regions based on a size and/or complexity of the initial region.

7. The method of claim 1, comprising dividing the render output into the set of initial regions based on an expected complexity of each resulting initial region.

8. The method of claim 1, wherein the initial sorting operation to sort the geometry into the set of initial regions is performed by a tiling unit of the plurality of tiling units.

9. The method of claim 1, wherein each tiling unit is selectively activatable; and the method comprises:

determining whether the number of tiling units activated should be changed; and when it is determined that the number of tiling units activated should be changed, changing the number of tiling units activated.

10. The method of claim 1, wherein the graphics processor comprises a plurality of graphics processing units, and each tiling unit of the plurality of tiling units is included in a respective graphics processing unit of the plurality of graphics processing units; and the method comprises:

partitioning the plurality of graphics processing units into plural partitions that each comprise one or more graphics processing units of the plurality of graphics processing units, wherein each partition is operable to generate a render output independently of any other partition of the plural partitions; and causing different partitions of the plural partitions to process different initial regions of the set of initial regions that the render output is divided into.

11. A tiled-based graphics processor comprising:

a plurality of tiling units operable to sort geometry to be processed to generate a render output into primitive listing regions that the render output is divided into; and an assigning circuit configured to, for each of one or more initial regions of a set of initial regions that a render output is divided into, and into which geometry to be processed to generate the render output is sorted by performing an initial sorting operation, and wherein each initial region of the set of initial regions encompasses plural primitive listing regions:

assign a tiling unit of the plurality of tiling units to sort geometry for the respective initial region into primitive listing regions that the respective initial region encompasses; and cause the assigned tiling unit to perform a subsequent sorting operation that comprises sorting the geometry for the respective initial region into the primitive listing regions that the respective initial region encompasses.

12. The processor of claim 11, wherein the processor is configured to perform the initial sorting operation by generating transformed geometry data, and using the transformed geometry data to sort the geometry into the set of initial regions; and a tiling unit performing a subsequent sorting operation comprises the tiling unit processing the transformed geometry data.

13. The processor of claim 11, wherein the processor is configured to perform the initial sorting operation to sort the geometry into the set of initial regions by processing a simplified representation of the geometry.

14. The processor of claim 11, wherein:

the plurality of tiling units comprises tiling units having different processing capacities; and the assigning circuit is configured to assign a tiling unit to sort geometry for an initial region of the set of initial regions based on a processing capacity of the tiling unit.

15. The processor of claim 11, wherein the assigning circuit is configured to assign a tiling unit to sort geometry for an initial region of the set of initial regions based on a size and/or complexity of the region.

16. The processor of claim 11, wherein the graphics processor is configured to divide the render output into the set of initial regions based on an expected complexity of each resulting initial region.

17. The processor of claim 11, wherein the plurality of tiling units comprises at least one tiling unit that is selectively configurable to either perform the initial sorting operation to sort geometry into the set of initial regions or to perform a subsequent sorting operation to sort geometry into a set of primitive listing regions.

18. The processor of claim 11, wherein each tiling unit is selectively activatable; and the processor comprises a control circuit configured to:

determine whether the number of tiling units activated should be changed; and when it is determined that the number of tiling units activated should be changed, change the number of tiling units activated.

19. The processor of claim 11, comprising:

a plurality of graphics processing units, wherein each tiling unit of the plurality of tiling units is included in a respective graphics processing unit of the plurality of graphics processing units; and a control circuit configured to:

partition the plurality of graphics processing units into plural partitions that each comprise one or more graphics processing units of the plurality of graphics processing units, wherein each partition is operable to generate a render output independently of any other partition of the plural partitions; and cause different partitions of the plural partitions to process different initial regions of the set of initial regions that the render output is divided into.

20. A non-transitory computer readable storage medium storing software code which when executing on a processor performs a method of operating a tiled-based graphics processor that comprises a plurality of tiling units operable to sort geometry to be processed to generate a render output into primitive listing regions that the render output is divided into; the method comprising:

performing an initial sorting operation that comprises sorting geometry to be processed to generate a render output into a set of initial regions that the render output is divided into, wherein each initial region of the set of initial regions encompasses plural primitive listing regions; and for each of one or more initial regions of the set of initial regions:

assigning a tiling unit of the plurality of tiling units to sort geometry for the respective initial region into primitive listing regions that the respective initial region encompasses; and the assigned tiling unit performing a subsequent sorting operation that comprises sorting the geometry for the respective initial region into the primitive listing regions that the respective initial region encompasses.

* * * * *